(12) United States Patent
Upendran et al.

(10) Patent No.: US 11,816,810 B2
(45) Date of Patent: Nov. 14, 2023

(54) 3-D RECONSTRUCTION USING AUGMENTED REALITY FRAMEWORKS

(71) Applicant: HOVER, INC., San Francisco, CA (US)

(72) Inventors: Manish Upendran, San Francisco, CA (US); William Castillo, Belmont, CA (US); Jena Dzitsiuk, San Francisco, CA (US); Yunwen Zhou, Belmont, CA (US); Matthew Thomas, San Francisco, CA (US)

(73) Assignee: HOVER INC., San Francisco, CA (US)

( * ) Notice: Subject to any disclaimer, the term of this patent is extended or adjusted under 35 U.S.C. 154(b) by 0 days.

(21) Appl. No.: 17/829,203

(22) Filed: May 31, 2022

(65) Prior Publication Data

US 2022/0327792 A1 Oct. 13, 2022

Related U.S. Application Data

(63) Continuation of application No. 17/118,370, filed on Dec. 10, 2020, now Pat. No. 11,380,078.
(Continued)

(51) Int. Cl.
*G06T 19/20* (2011.01)
*G06T 7/73* (2017.01)

(52) U.S. Cl.
CPC .............. *G06T 19/20* (2013.01); *G06T 7/74* (2017.01); *G06T 2207/10028* (2013.01); *G06T 2210/04* (2013.01); *G06T 2219/2016* (2013.01)

(58) Field of Classification Search
None
See application file for complete search history.

(56) References Cited

U.S. PATENT DOCUMENTS 10,373,299 B1 * 8/2019 Holub ................. G06T 1/0071
2014/0176543 A1 6/2014 MacDonald et al.
(Continued)

FOREIGN PATENT DOCUMENTS

WO WO2017215899 A2 12/2017
WO WO2018138516 A1 8/2018

OTHER PUBLICATIONS

Manish Upendran, Notice of Allowance, U.S. Appl. No. 17/118,370, dated Mar. 1, 2022, 9 pgs.
(Continued)

*Primary Examiner* — Frank S Chen
(74) *Attorney, Agent, or Firm* — Morgan, Lewis & Bockius LLP

(57) ABSTRACT

System and method are provided for scaling a 3-D representation of a building structure. The method includes obtaining images of the building structure, including non-camera anchors. The method also includes identifying reference poses for images based on the non-camera anchors. The method also includes obtaining world map data including real-world poses for the images. The method also includes selecting candidate poses from the real-world poses based on corresponding reference poses. The method also includes calculating a scaling factor for a 3-D representation of the building structure based on correlating the reference poses with the selected candidate poses. Some implementations use structure from motion techniques or LiDAR, in addition to augmented reality frameworks, for scaling the 3-D representations of the building structure. In some implementations, the world map data includes environmental data, such as illumination data, and the method includes generating or displaying the 3-D representation.

24 Claims, 20 Drawing Sheets

Related U.S. Application Data

(60) Provisional application No. 63/123,379, filed on Dec. 9, 2020, provisional application No. 62/948,151, filed on Dec. 13, 2019.

(56) References Cited

U.S. PATENT DOCUMENTS

| | | | |
|---|---|---|---|
| 2015/0186418 A1 | 7/2015 | Harp et al. | |
| 2015/0213590 A1* | 7/2015 | Brown | G06T 17/05 345/419 |
| 2016/0026253 A1 | 1/2016 | Bradski et al. | |
| 2016/0260250 A1* | 9/2016 | Jovanovic | H04N 13/246 |
| 2018/0286065 A1 | 10/2018 | Knorr et al. | |
| 2019/0075274 A1 | 3/2019 | Meier et al. | |
| 2020/0334395 A1 | 10/2020 | Duff et al. | |
| 2021/0035455 A1 | 2/2021 | Hall et al. | |
| 2021/0118184 A1* | 4/2021 | Pillai | G06N 3/0418 |

OTHER PUBLICATIONS

Hover, Inc., PCT/US2021/062381, International Search Report and Written Opinion, dated Feb. 17, 2022, 9 pgs.
Hover, Inc., PCT/US2021/062381, International Preliminary Report on Patentability, dated Jun. 13, 2023, 7 pgs.
Hover, Inc., PCT/US2020/064650, International Search Report and Written Opinion, dated Mar. 19, 2021, 8 pgs.
Hover, Inc., PCT/US2020/064650, International Preliminary Report on Patentability, dated May 14, 2022, 6 pgs.
Hover, Inc., EP20899031.7, Supplementary European Search Report, dated Jun. 23, 2023, 8 pgs.
C Küblbeck et al., "Face detection and tracking in video sequences using the modifiedcensus transformation", Image and Vision Computing 24.6 (2006): 564-572, Department of Electronic Imaging, Fraunhofer Institute for Integrated Circuits, Am Wolfsmantel 33, 91058 Erlangen, Germany, Received Dec. 7, 2004; received in revised form Jul. 8, 2005; accepted Aug. 23, 2005, 9 pgs.

* cited by examiner

The plurality of anchors include a plurality of camera positions, and the reference poses and the real-world poses include positional vectors and transforms of the plurality of camera positions ~322

Figure 3E

The world map data further comprises data for the non-camera anchors within an image ~324

Augment the data for the non-camera anchors within an image with point cloud information ~326

The point cloud information is generated by a LiDAR sensor ~328

Figure 3F

3-D RECONSTRUCTION USING AUGMENTED REALITY FRAMEWORKS

RELATED APPLICATIONS

This application is a continuation of U.S. patent application Ser. No. 17/118,370, filed on Dec. 10, 2020, entitled "3-D Reconstruction Using Augmented Reality Frameworks," which claims priority to U.S. Provisional Patent Application No. 62/948,151, filed Dec. 13, 2019, entitled "3-D Reconstruction Using Augmented Reality Frameworks," and U.S. Provisional Patent Application No. 63/123,379, filed Dec. 9, 2020, entitled "3-D Reconstruction Using Augmented Reality Frameworks," each of which is incorporated by reference herein in its entirety.

TECHNICAL FIELD

The disclosed implementations relate generally to 3-D reconstruction and more specifically to scaling 3-D representations of building structures using augmented reality frameworks.

BACKGROUND

3-D building models and visualization tools can produce significant cost savings. Using accurate 3-D models of properties, homeowners, for instance, can estimate and plan every project. With near real-time feedback, contractors could provide customers with instant quotes for remodeling projects. Interactive tools can enable users to view objects (e.g., buildings) under various conditions (e.g., at different times, under different weather conditions). 3-D models may be reconstructed from various input image data, but excessively large image inputs, such as video input, may require costly computing cycles and resources to manage, whereas image sets with sparse data fail to capture adequate information for realistic rendering or accurate measurements for 3-D models. At the same time, augmented reality (AR) is gaining popularity among consumers. Devices (e.g., smartphones) equipped with hardware (e.g., camera sensors) as well as software (e.g., augmented reality frameworks) are gaining traction. Such devices enable consumers to make AR content with standard phones. Despite these advantages, sensor drift and noise otherwise can make AR devices and attendant information prone to location inaccuracies. There are no known techniques that incorporate data gathered from AR-enabled devices or frameworks with other image data that provide measurements for homes, or use the information, such as illumination data, to generate realistic rendering of 3-D models of homes.

SUMMARY

Accordingly, there is a need for systems and methods for 3-D reconstruction of building structures (e.g., homes) that leverage augmented reality frameworks. The techniques disclosed herein enable users to capture images of a building (e.g., as few as 6-8 images), and use augmented reality maps (or similar collections of metadata associated with an image expressed in world coordinates, herein referred to as a "world map" and further described below) generated by the devices to generate accurate measurements of the building or generate realistic rendering of 3-D models of the building (e.g., illuminating the 3-D models using illumination data gathered via the augmented reality frameworks). The proposed techniques can enhance user experience in a wide range of applications, such as home remodeling, and architecture visualizations.

FIG. 4 illustrates an exemplary house having linear features 402, 404, 406 and 408. A camera may observe the front façade of such house and capture an image 422, wherein features 402 and 404 are visible. A second image 424 may be taken from which features 402, 404, 406 and 408 are all visible. Using these observed features, camera positions 432 and 434 can be approximated based on images 422 and 424 using techniques such as Simultaneous Localization and Mapping (SLAM) or its derivatives (e.g. ORB-SLAM) or epipolar geometry. These camera position solutions in turn provide for relative positions of identified features in three dimensional space; for example, roofline 402 may be positioned in three dimensional space based on how it appears in the image(s), as well as lines 404 and so on such that the house may be reconstructed in three dimensional space. In such a setup, the camera positions 432 and 434 are relative to each other and the modeled house, and unless true dimensions of the transformations between positions 432 and 434 or the house are known, it cannot be determined if the resultant solution is for a very large house or a very small house or if the distances between camera positions is very large or very small. Measurement in such an environment can still be done, albeit with arbitrary values, and modeling programs may assign axis origins to the space and provide default distances for the scene (distances between cameras, distances related to the modeled object) but this is not a geometric coordinate system so measurements within the scene have low practical value.

Augmented reality (AR) frameworks on the other hand offer geometric values as part of its datasets. Distances between AR camera positions is therefore available in the form of transformations and vector data provided by the AR framework. AR camera positions can, however, suffer from drift as its sensor data compounds over longer sessions.

So while a derived camera position, such as one in FIG. 4, may be accurately placed it cannot provide geometric information; and while an AR camera may provide geometric information it is not always accurately placed.

Systems, methods, devices, and non-transitory computer readable storage media are provided for leveraging the derived camera (herein also referred to as cameras with "reference pose") to identify accurately placed AR cameras. A set of accurately placed AR cameras may then be used for scaling a 3-D representation of a building structure subject to capture by the cameras. A raw data set for AR camera data, such as directly received by a cv.json output by a host AR framework, may be referred to a "real-world pose" denoting geometric data for that camera with objective positional information (e.g., WGS-84 reference datum, latitude and longitude). AR cameras with real-world pose that have been accurately placed by incorporating with or validating from information of reference pose data may be referred to as cameras having a "candidate pose."

According to some implementations, a method is provided for scaling a 3-D representation of a building structure. The method includes obtaining a plurality of images of a building structure. The plurality of images comprises non-camera anchors. In some implementations, the non-camera anchors are planes, lines, points, objects, and other features within an image of a building structure or its surrounding environment. Non-camera anchors may be generated or identified by an AR framework, or by computer vision extraction techniques operated upon the image data for reference poses. Some implementations use human annotations or computer vision techniques like line extraction methods or point detection to automate identification of the non-camera anchors. Some implementations use augmented reality (AR) frameworks, or output from AR cameras to obtain this data. In some implementations, each image of the plurality of images is obtained at arbitrary, distinct, or sparse positions about the building structure.

The method also includes identifying reference poses for the plurality of images based on the non-camera anchors. In some implementations, identifying the reference poses includes generating a 3-D representation for the building structure. Some implementations generate the 3-D representation using structure from motion techniques, and may generate dense camera solves in turn. In some implementations, the plurality of images is obtained using a mobile imager, such as a smartphone, ground-vehicle mounted camera, or camera coupled to aerial platforms such as aircraft or drones otherwise, and identifying the reference poses is further based on photogrammetry, GPS data, gyroscope, accelerometer data, or magnetometer data of the mobile imager. Though not limiting on the full scope of the disclosure, continued reference will be made to images obtained by a smartphone, but the techniques are applicable to the classes of mobile imagers mentioned above. Some implementations identify the reference poses by generating a camera solve for the plurality of images, including determining the relative position of camera positions based on how and where common features are located in respective image plane of each image of the plurality of images. Some implementations use Simultaneous Localization and Mapping (SLAM) or similar functions for identifying camera positions. Some implementations use computer vision techniques along with GPS or sensor information, from the camera, for an image, for camera pose identification.

The method also includes obtaining world map data including real-world poses for the plurality of images. In some implementations, the world map data is obtained while capturing the plurality of images. In some implementations, the plurality of images is obtained using a device (e.g., an AR camera) configured to generate the world map data. Some implementations receive AR camera data for each image of the plurality of images. The AR camera data includes data for the non-camera anchors within the image as well as data for camera anchors (e.g., the real-world pose). Translation changes between these camera positions are in geometric space, but are a function of sensors that can be noisy (e.g., due to drifts in IMUs). In some instances, AR tracking states indicate interruptions, such as phone calls, or a change in camera perspective, that affect the ability to predict how current AR camera data relates to previously captured AR camera data.

In some implementations, the plurality of anchors includes a plurality of objects in an environment for the building structure, and the reference poses and the real-world poses include positional vectors and transforms (e.g., x, y, z coordinates, and rotational and translational parameters) of the plurality of objects. In some implementations, the plurality of anchors includes a plurality of camera positions, and the reference poses and the real-world poses include positional vectors and transforms of the plurality of camera positions. In some implementations, the world map data further includes data for the non-camera anchors within an image of the plurality of images. Some implementations augment the data for the non-camera anchors within an image with point cloud data. In some implementations, the point cloud information is generated by a Light Detection and Ranging (LiDAR) sensor. In some implementations, the plurality of images is obtained using a device configured to generate the real-world poses based on sensor data.

The method also includes selecting candidate poses from the real-world poses based on corresponding reference poses. Some implementations select at least sequential candidate poses from the real-world poses based on the corresponding reference poses. Some implementations compare a ratio of translation changes of the reference poses to the ratio of translation changes in the corresponding real-world poses. Some implementations discard real-world poses where the ratio or proportion is not consistent with the reference pose ratio. Some implementations use the resulting candidate poses for applying their geometric translation as a scaling factor as further described below.

In some implementations, the world map data includes tracking states that include validity information for the real-world poses. Some implementations select the candidate poses from the real-world poses further based on validity information in the tracking states. Some implementations select poses that have tracking states with high confidence positions, or discard poses with low confidence levels. In some implementations, the plurality of images is captured using a smartphone, and the validity information corresponds to continuity data for the smartphone while capturing the plurality of images.

The method also includes calculating a scaling factor for a 3-D representation of the building structure based on correlating the reference poses with the candidate poses. In some implementations, calculating the scaling factor is further based on obtaining an orthographic view of the building structure, calculating a scaling factor based on the orthographic view, and adjusting (i) the scale of the 3-D representation based on the scaling factor, or (ii) a previous scaling factor based on the orthographic scaling factor. For example, some implementations determine scale using satellite imagery that provide an orthographic view. Some implementations perform reconstruction steps to show a plan view of the 3-D representation or camera information or image information associated with the 3-D representation. Some implementations zoom in/out the reconstructed model until it matches the orthographic view, thereby computing the scale. Some implementations perform measurements based on the scaled 3-D structure.

In some implementations, calculating the scaling factor is further based on identifying one or more physical objects (e.g., a door, a siding, bricks) in the 3-D representation, determining dimensional proportions of the one or more physical objects, and deriving or adjusting a scaling factor based on the dimensional proportions. This technique provides another method of scaling for cross-validation, using objects in the image. For example, some implementations locate a door and then compare the dimensional proportions of the door to what is known about the door. Some implementations also use siding, bricks, or similar objects with predetermined or industry standard sizes.

In some implementations, calculating the scaling factor for the 3-D representation includes establishing correspondence between the candidate poses and the reference poses, identifying a first pose and a second pose of the candidate poses separated by a first distance, identifying a third pose and a fourth pose of the reference poses separated by a second distance, the third pose and the fourth pose corresponding to the first pose and the second pose, respectively, and computing the scaling factor as a ratio between the first distance and the second distance. In some implementations, this ratio is calculated for additional camera pairing and aggregated to produce a scale factor. In some implementations, identifying the reference poses includes associating identifiers for the reference poses, the world map data includes identifiers for the real-world poses, and establishing the correspondence is further based on comparing the identifiers for the reference poses with the identifiers for the real-world poses.

In some implementations, the method further includes generating a 3-D representation for the building structure based on the plurality of images. In some implementations, the method also includes extracting a measurement between two pixels in the 3-D representation by applying the scaling factor to the distance between the two pixels. In some implementations, the method also includes displaying the 3-D representation or the measurements for the building structure based on scaling the 3-D representation using the scaling factor.

In some implementations, the method further includes extracting illumination data (e.g., ambient lighting information) for the candidate poses from the world map data. The method also includes generating or displaying a 3-D representation of the building structure, including illuminating the 3-D representation based on the illumination data for the candidate poses. In some implementations, displaying the 3-D representation of the building structure comprises displaying pixels for the one or more anchors. Some implementations transmit the 3-D representation (with the illumination effects) to a client device to display the 3-D representation of the building. In some implementations, the method further includes receiving a user input selecting a perspective for displaying the 3-D representation, determining, for the perspective, one or more anchors from amongst the plurality of anchors, based on the candidate poses, extracting illumination data for the one or more anchors from the world map data, and illuminating the 3-D representation further based on the illumination data for the one or more anchors. In some implementations, illuminating the 3-D representation is further based on averaging the illumination data for a first anchor and a second anchor of the one or more anchors.

In another aspect, a computer system includes one or more processors, memory, and one or more programs stored in the memory. The programs are configured for execution by the one or more processors. The programs include instructions for performing any of the methods described herein.

In another aspect, a non-transitory computer readable storage medium stores one or more programs configured for execution by one or more processors of a computer system. The programs include instructions for performing any of the methods described herein.

BRIEF DESCRIPTION OF THE DRAWINGS

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details or in alternate sequences or combinations. In other instances, well-known methods, procedures, components, and circuits have not been described in detail so as not to unnecessarily obscure aspects of the implementations.

Disclosed implementations enable 3-D reconstruction of building structures. Some implementations generate measurements for building structures. Some implementations generate 3-D representations of building structures, including illuminating the 3-D representations using data obtained while capturing images of the building structures. Systems and devices implementing the techniques in accordance with some implementations are illustrated in FIGS. 1-5.

Figure 1A:
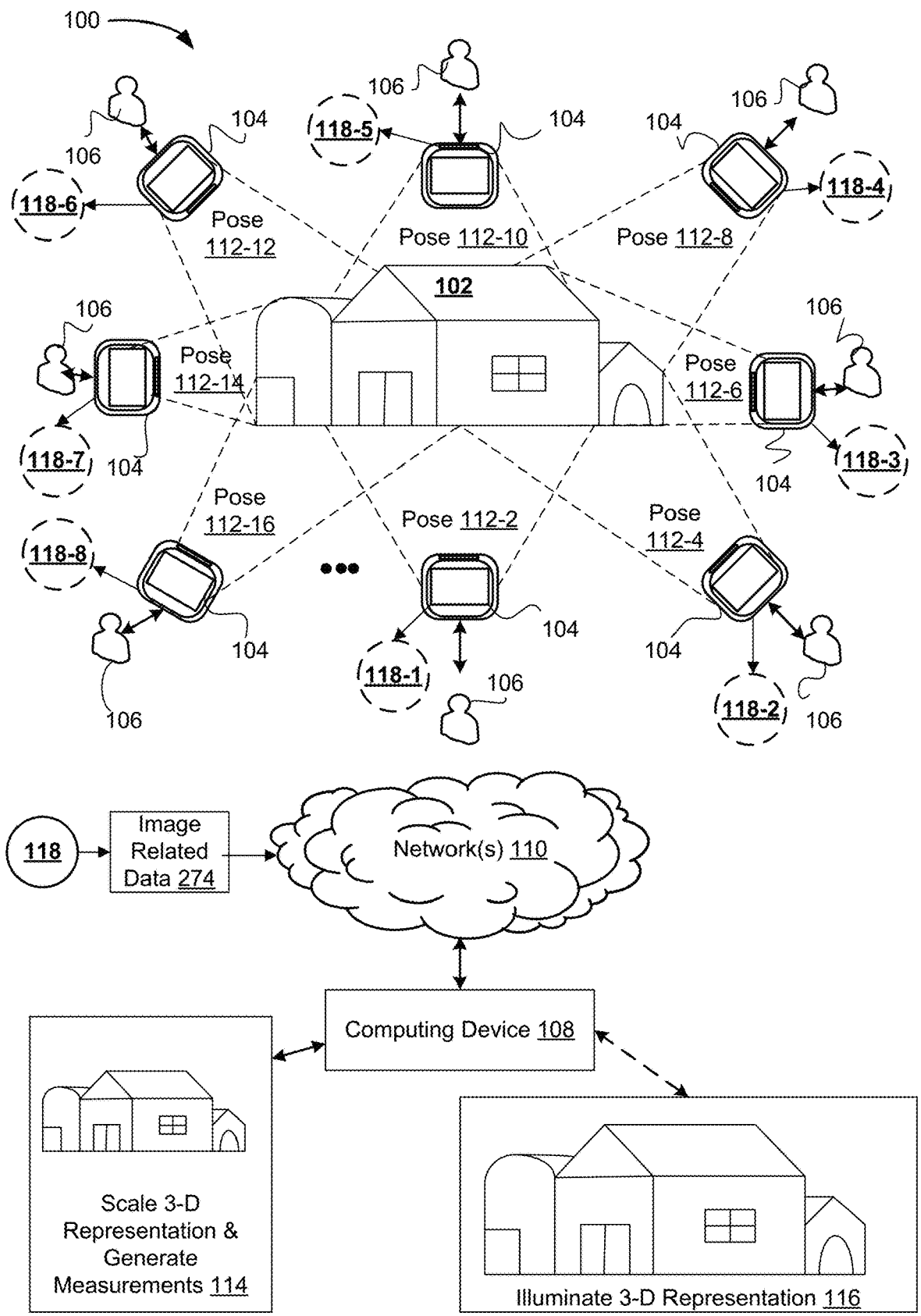
FIG. 1A is a schematic diagram of a computing system for 3-D reconstruction of building structures, in accordance with some implementations.

FIG. 1A is a block diagram of a computer system 100 that enables 3-D reconstruction (e.g., generating geometries, deriving measurements for, or illuminating 3-D representations) of building structures, in accordance with some implementations. In some implementations, the computer system 100 includes image capture devices 104, and a computing device 108.

An image capture device 104 communicates with the computing device 108 through one or more networks 110. The image capture device 104 provides image capture functionality (e.g., take photos of images) and communications with the computing device 108. In some implementations, the image capture device is connected to an image preprocessing server system (not shown) that provides server-side functionality (e.g., preprocessing images, such as creating textures, storing environment maps (or world maps) and images and handling requests to transfer images) for any number of image capture devices 104.

In some implementations, the image capture device 104 is a computing device, such as desktops, laptops, smartphones, and other mobile devices, from which users 106 can capture images (e.g., take photos), discover, view, edit, or transfer images. In some implementations, the users 106 are robots or automation systems that are pre-programmed to capture images of the building structure 102 at various angles (e.g., by activating the image capture image device 104). In some implementations, the image capture device 104 is a device capable of (or configured to) capture images and generate (or dump) world map data for scenes. In some implementations, the image capture device 104 is an augmented reality camera or a smartphone capable of performing the image capture and world map generation functions. In some implementations, the world map data includes (camera) pose data, tracking states, or environment data (e.g., illumination data, such as ambient lighting).

In some implementations, a user 106 walks around a building structure (e.g., the house 102), and takes pictures of the building 102 using the device 104 (e.g., an iPhone) at different poses (e.g., the poses 112-2, 112-4, 112-6, 112-8, 112-10, 112-12, 112-14, and 112-16). Each pose corresponds to a different perspective or a view of the building structure 102 and its surrounding environment, including one or more objects (e.g., a tree, a door, a window, a wall, a roof) around the building structure. Each pose alone may be insufficient to generate a reference pose or reconstruct a complete 3-D model of the building 102, but the data from the different poses can be collectively used to generate reference poses and the 3-D model or portions thereof, according to some implementations. In some instances, the user 106 completes a loop around the building structure 102. In some implementations, the loop provides validation of data collected around the building structure 102. For example, data collected at the pose 112-16 is used to validate data collected at the pose 112-2.

At each pose, the device 104 obtains (118) images of the building 102, and world map data (described below) for objects (sometimes called anchors) visible to the device 104 at the respective pose. For example, the device captures data 118-1 at the pose 112-2, the device captures data 118-2 at the pose 112-4, and so on. As indicated by the dashed lines around the data 118, in some instances, the device fails to capture the world map data, illumination data, or images. For example, the user 106 switches the device 104 from a landscape to a portrait mode, or receives a call. In such circumstances of system interruption, the device 104 fails to capture valid data or fails to correlate data to a preceding or subsequent pose. Some implementations also obtain or generate tracking states (further described below) for the poses that signify continuity data for the images or associated data. The data 118 (sometimes called image related data 274) is sent to a computing device 108 via a network 110, according to some implementations.

Although the description above refers to a single device 104 used to obtain (or generate) the data 118, any number of devices 104 may be used to generate the data 118. Similarly, any number of users 106 may operate the device 104 to produce the data 118.

In some implementations, the data 118 is collectively a wide baseline image set, that is collected at sparse positions (or poses 112) around the building structure 102. In other words, the data collected may not be a continuous video of the building structure or its environment, but rather still images or related data with substantial rotation or translation between successive positions. In some embodiments, the data 118 is a dense capture set, wherein the successive frames and poses 112 are taken at frequent intervals. Notably, in sparse data collection such as wide baseline differences, there are fewer features common among the images and deriving a reference pose is more difficult or not possible. Additionally, sparse collection also produces fewer corresponding real-world poses and filtering these, as described further below, to candidate poses may reject too many real-world poses such that scaling is not possible.

The computing device 108 obtains the image-related data 274 via the network 110. Based on the data received, the computing device 108 generates a 3-D representation of the building structure 102. As described below in reference to FIGS. 2-5, in various implementations, the computing device 108 scales the 3-D representation thereby generating (114) measurements for the 3-D representation, or generates and displays (116) the 3-D representation, including illuminating the 3-D representation using the illumination data.

The computer system 100 shown in FIG. 1 includes both a client-side portion (e.g., the image capture devices 104) and a server-side portion (e.g., a module in the computing device 108). In some implementations, data preprocessing is implemented as a standalone application installed on the computing device 108 or the image capture device 104. In addition, the division of functionality between the client and server portions can vary in different implementations. For example, in some implementations, the image capture device 104 uses a thin-client module that provides only image search requests and output processing functions, and delegates all other data processing functionality to a backend server (e.g., the server system 108). In some implementations, the computing device 108 delegates image processing functions to the image capture device 104, or vice-versa.

The communication network(s) 110 can be any wired or wireless local area network (LAN) or wide area network (WAN), such as an intranet, an extranet, or the Internet. It is sufficient that the communication network 110 provides communication capability between the image capture devices 104, the computing device 108, or external servers (e.g., servers for image processing, not shown). Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The computing device 108 or the image capture devices 104 are implemented on one or more standalone data processing apparatuses or a distributed network of computers. In some implementations, the computing device 108 or the image capturing devices 104 also employ various virtual devices or services of third party service providers (e.g., third-party cloud service providers) to provide the underlying computing resources or infrastructure resources.

Figure 1B:
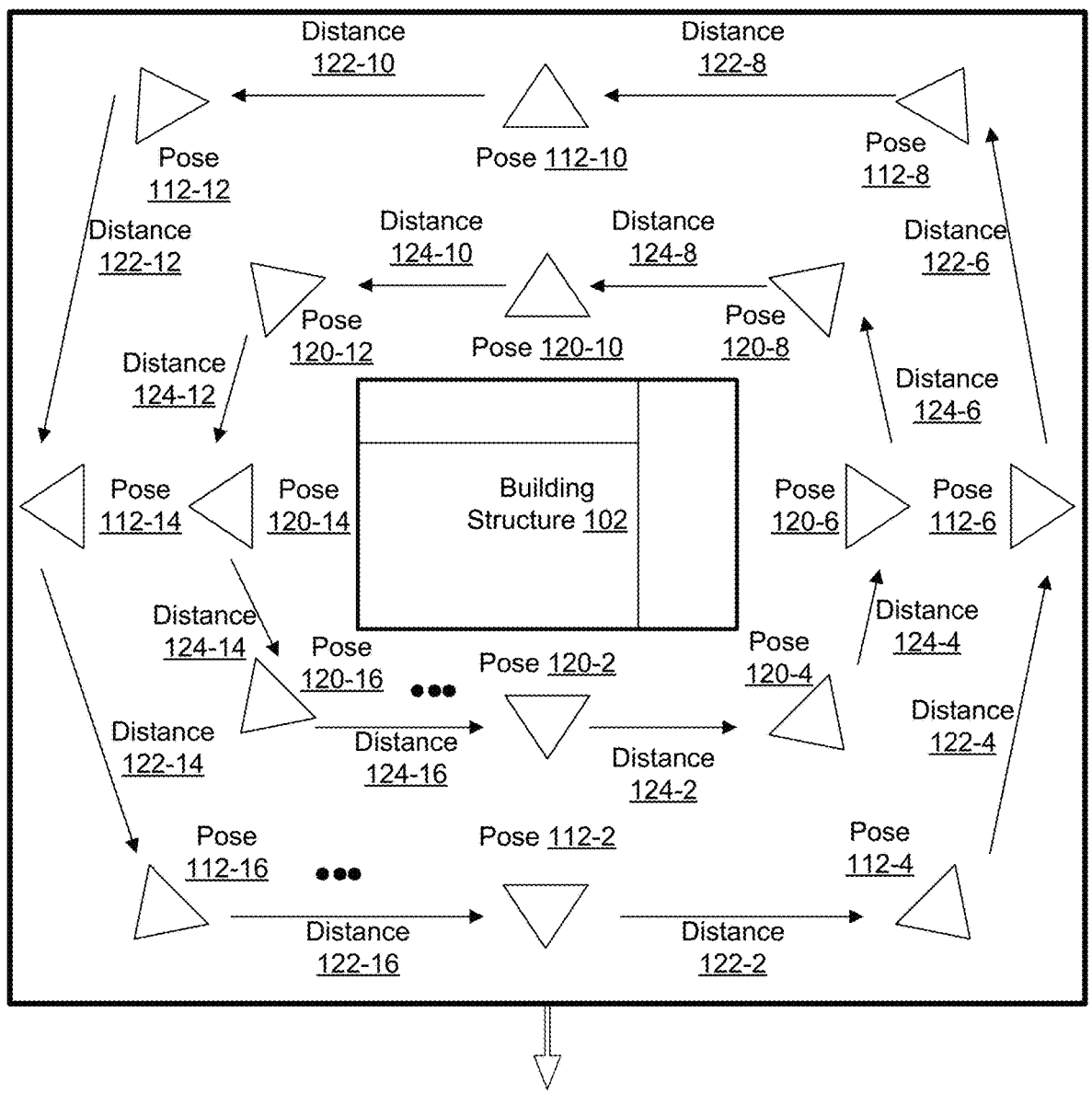
FIG. 1B is a schematic diagram of a computing system for scaling 3-D models of building structures, in accordance with some implementations.

FIG. 1B is a schematic diagram of a computing system for scaling 3-D models of building structures, in accordance with some implementations. Similar to FIG. 1A, the poses 112-2, 112-4, . . . , 112-16 (sometimes called real-world poses) correspond to respective positions where a user obtains images of the building structure 102, and associated augmented reality maps. The poses are separated by respective distances 122-2, 122-4, . . . , 122-16. Poses 120-2, 120-4, . . . , 120-16 (sometimes called reference poses) are obtained using an alternative methodology that does not use augmented reality frameworks. For example, theses poses are derived based on images captured and correlated features among them, or sensor data for identified anchor points detected by the camera itself or learned via machine learning (for example, horizontal or vertical planes, openings such as doors or windows, etc.). The reference poses are separated by respective distances 124-2, 124-4, . . . , 124-16. Some implementations establish correspondences between or make associations among the real-world poses and reference poses, and derive a scaling factor for generated 3-D models.

Figure 5:
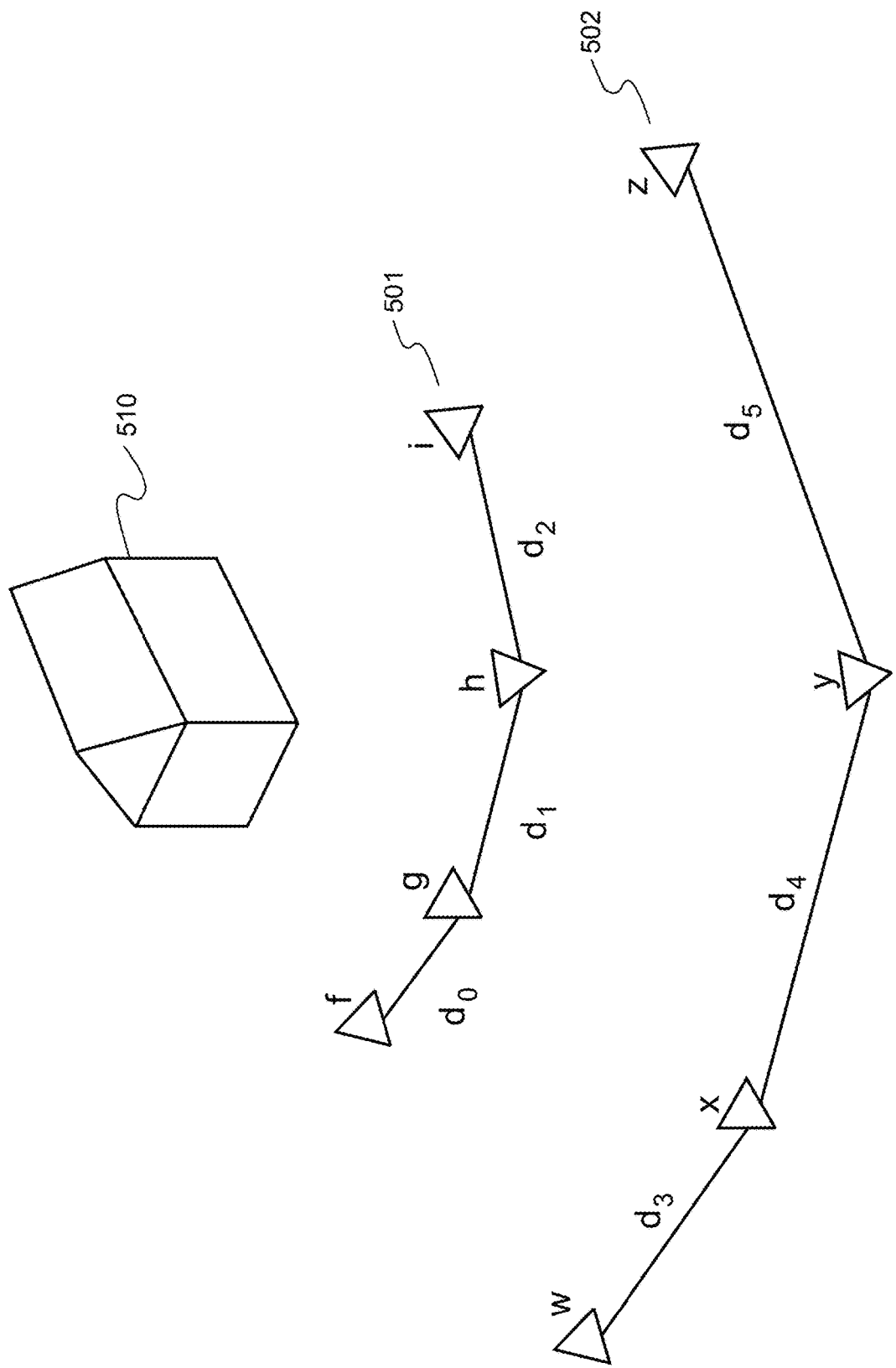
FIG. 5 illustrates incorporating reference pose information into real-world pose information, in accordance with some implementations.

For example, FIG. 5 illustrates association techniques according to some implementations. FIG. 5 shows a series of reference poses 501 for cameras f-g-h-i, separated by translation distances $d_0$, $d_1$, and $d_2$. Reference poses 501 are those derived from image data and placed relative to reconstructed model 510 of a house. As described above, such placement and values of $d_0$, $d_1$, and $d_2$ are based on relative values of the coordinate space according to the model based on the cameras. Also depicted are real-world poses 502 for cameras w-x-y-z, separated by distances $d_3$, $d_4$, and $d_5$, as they would be located about the actual position of the house that model 510 is based on. As described above, $d_3$, $d_4$, and $d_5$ are based on AR framework data and represent actual geometric distances (such as feet, meters, etc.). Though poses 501 and 502 are depicted at different positions, it will be appreciated that they reflect common camera information; in other words, camera f of reference poses 501 and camera w of real-world poses 502 reflect a common camera, just that one is generated by visual triangulation and represented in model or image space (the camera from set 501) and one is generated by AR frameworks and represented in geometric space (the camera from set 502).

In some implementations, ratios of the translation distances as between reference poses and real-world poses are analyzed to select candidate poses from the real-world poses to use for scaling purposes, or to otherwise discard the data for real-world poses that do not maintain the ratio. In some implementations, the ratio is set by the relationship of distances between reference poses and differences between real-world poses, such as expressed by the following equation:

$$\frac{d_0}{d_3} = \frac{d_1}{d_4}$$

For those pairings that satisfy such expression, the real-world cameras are presumed to be accurately placed (e.g. the geometric distances $d_3$ and $d_4$ are accurate and cameras w, x, and y are in correct geolocation, such as per GPS coordinates or the like). If the expression is not satisfied, or substantially satisfied, one or more of the real-world camera(s) are discarded and not used for further analyses.

In some implementations, cross ratios among the reference poses and real-world poses are used, such as expressed by the following equation:

$$\frac{\frac{d_0}{d_1}}{\frac{d_1}{d_2}} = \frac{\frac{d_3}{d_4}}{\frac{d_4}{d_5}}$$

For those cameras and distances that satisfy such expression, the real-world cameras are presumed to be accurately placed (e.g. the geometric distances $d_3$, $d_4$, and $d_5$ are accurate and cameras w, x, y and z are in correct geolocation, such as per GPS coordinates or the like). If the expression is not satisfied, or substantially satisfied, one or more of the real-world camera(s) are discarded and not used for further analyses.

Some implementations pre-filter or select real-world poses that have valid tracking states (as explained above and further described below) prior to correlating the real-world poses with the reference poses. In some implementations, such as the pose association examples described above, the operations are repeated for various real-world pose and reference pose combinations until at least two consecutive real-world cameras are validated, thereby making them candidate poses for scaling. A suitable scaling factor is calculated from the at least two candidate poses by correlating them with their reference pose distances such that the scaling factor for the 3-D model is the distance between the candidate poses divided by the distance between the reference poses. In some implementations, an average scaling factor across all candidate poses and their corresponding reference poses is aggregated and applied to the modeled scene. The result of such operation is to generate a geometric value for any distance between two points in the model space the reference poses are placed in. For example, if the distance between two candidate poses is 5 meters, and the distance between the corresponding reference poses is 0.5 units (units being the arbitrary measurement units of the modeling space the reference poses are positioned in), then a scaling factor of 10 may be derived. Accordingly, the distance between two points of the model whether measured by pixels or model space units may be multiplied by 10 to derive a geometric measurement between those points.

For sparse image collection, discarding real-world poses that do not satisfy the above described relationships can render the overall solution inadequate for deriving a scaling factor as there are only a limited set of poses to work with in the first place. The loss of too many for failure to satisfy the ratios described above, or for diminished tracking as reduced image flow in a sparse capture may exacerbate, may not leave enough remaining to use as candidate poses. Further compounding the sparse image collection is the ability to generate reference poses. Reference pose determination relies upon feature matching across images, which wide baseline image sets cannot guarantee either by lack of common features in the imaged object from a given pose (the new field of view shares insufficient common features with respect to a previous field of view) or lack of ability to capture the requisite features (constraints such as tight lot lines preclude any field of view from achieving the desired feature overlap).

Figure 1C:
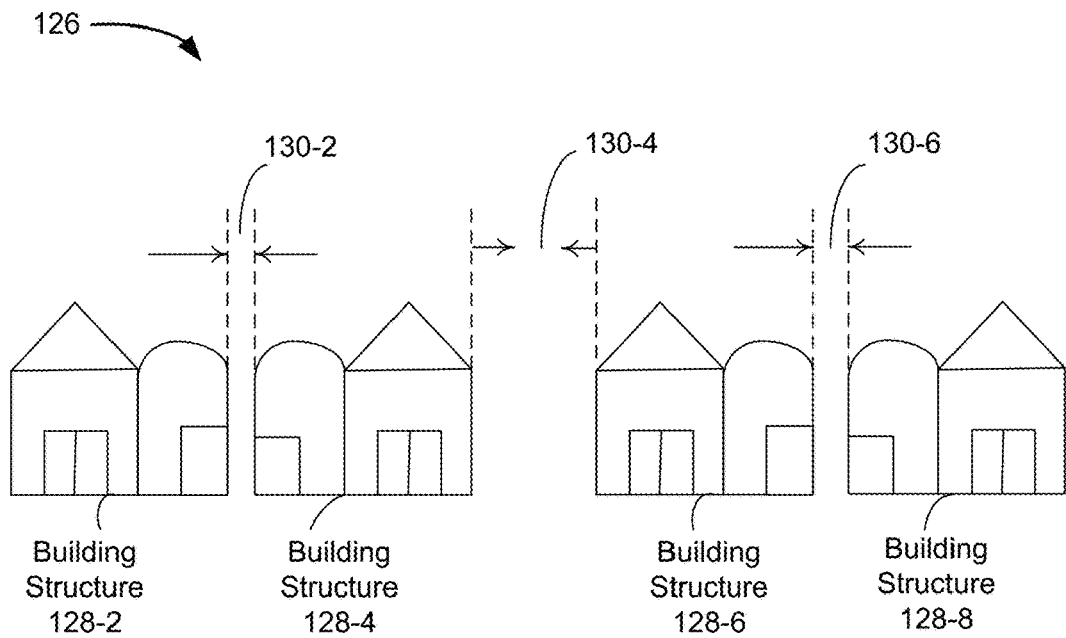
FIG. 1C shows an example layout with building structures separated by tight lot lines.

FIG. 1C shows an example layout 126 with building structures separated by tight lot lines. The example shows building structures 128-2, 128-4, 138-6, and 128-8. The building structures 128-4 and 128-6 are separated by a wider space 130-4, whereas the building structure 128-2 and 128-4, and 128-6 and 128-8, are each separated by narrower spaces 130-2 and 130-6, respectively. This type of layout is typical in densely populated areas. The tight lot lines make gathering continuous imagery of building structures difficult, if not impossible. As described below, some implementations use augmented AR data, structure from motion techniques, or LiDAR data, to overcome limitations due to tight lot lines. These techniques generate additional features that increase both the number of reference poses and real-world poses due to the more frames involved in the capture pipeline and features available, or a greater number of features available in any one frame that may be viewable in a subsequent one. For example, a sparse image capture combined with sparse LiDAR points may introduce enough common features between poses that passive sensing of the images would not otherwise produce.

Figure 1D:
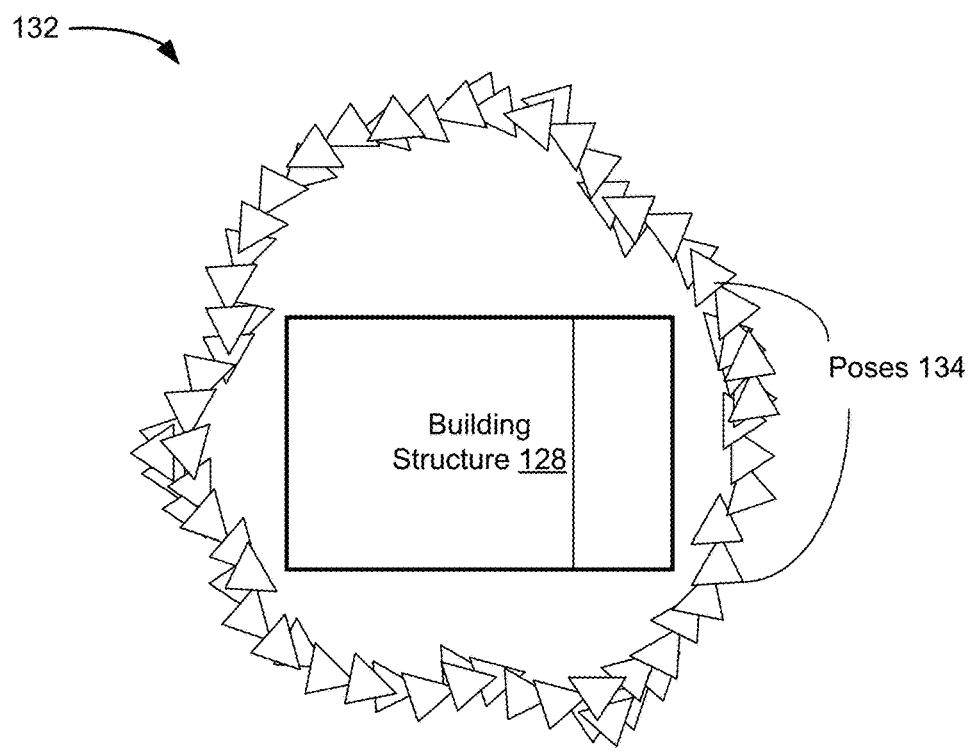
FIG. 1D shows a schematic diagram of a dense capture of images of a building structure, in accordance with some implementations.

FIG. 1D shows a schematic diagram of a dense capture 132 of images of a building structure, in accordance with some implementations. In the example shown, a user captures video or a set of dense images by walking around the building structure 128. Each camera position corresponds to a pose 134, and each pose is separated by a miniscule distance. Although FIG. 1D shows a continuous set of poses around the building structure, because of tight lot lines, it is typical to have sequences of dense captures or sets of dense image sequences that are interrupted by periods where there are either no images or only a spare set of images. Notwithstanding occasional sparsity in the set of images, the dense capture or sequences of dense set of images can be used to filter real-world poses obtained from AR frameworks.

Figure 2A:
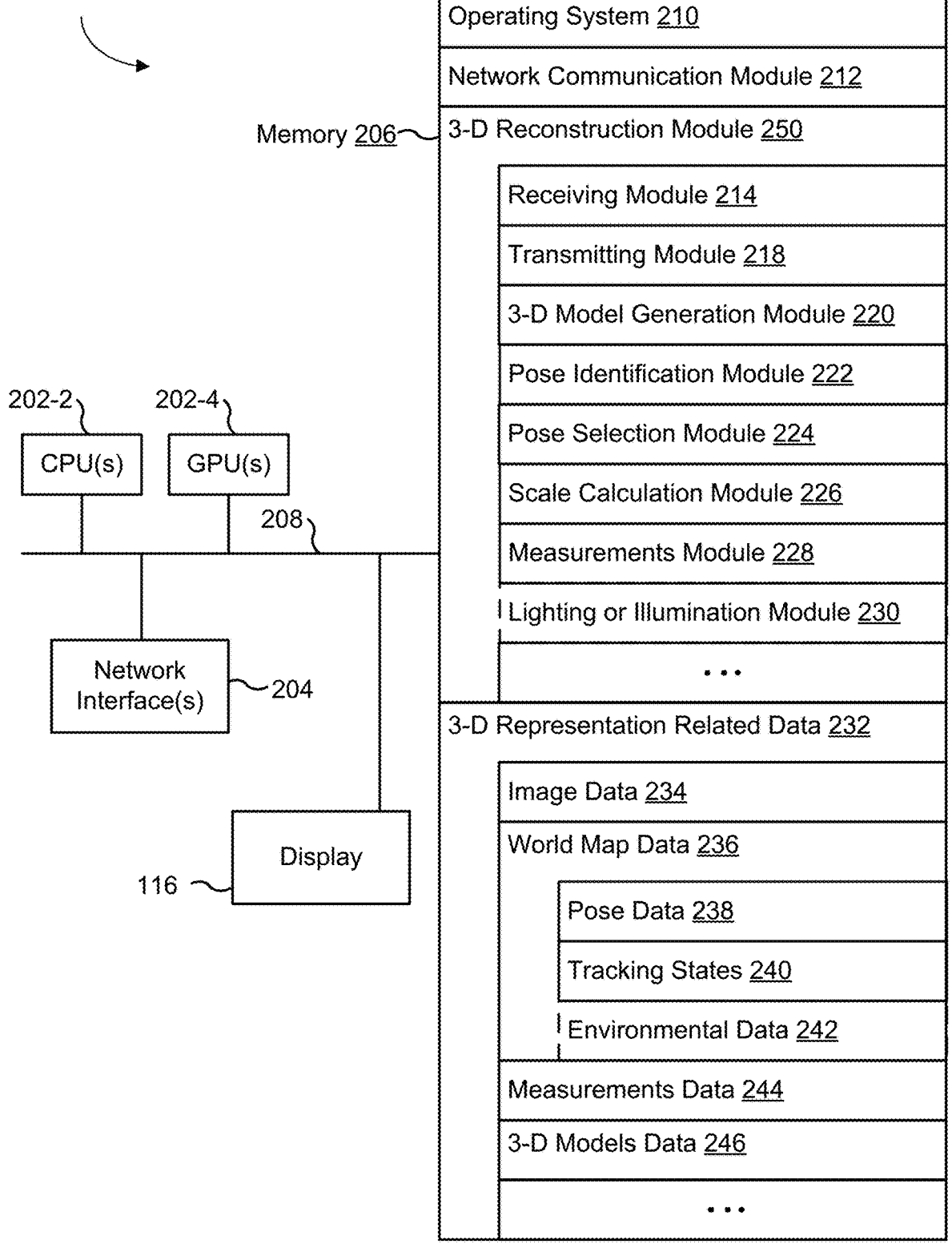
FIG. 2A is a block diagram of a computing device for 3-D reconstruction of building structures, in accordance with some implementations.

FIG. 2A is a block diagram illustrating the computing device 108 in accordance with some implementations. The server system 108 may include one or more processing units (e.g., CPUs 202-2 or GPUs 202-4), one or more network interfaces 204, one or more memory units 206, and one or more communication buses 208 for interconnecting these components (e.g. a chipset).

The memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, optionally, includes one or more storage devices remotely located from one or more processing units 202. The memory 206, or alternatively the non-volatile memory within the memory 206, includes a non-transitory computer readable storage medium. In some implementations, the memory 206, or the non-transitory computer readable storage medium of the memory 206, stores the following programs, modules, and data structures, or a subset or superset thereof:

- operating system 210 including procedures for handling various basic system services and for performing hardware dependent tasks;
- network communication module 212 for connecting the computing device 108 to other computing devices (e.g., image capture devices 104, or image-related data sources) connected to one or more networks 110 via one or more network interfaces 204 (wired or wireless);
- 3-D reconstruction module 250, which provides 3-D model generation, measurements/scaling functions, or displaying 3-D models (with illumination), includes, but is not limited to:
  - a receiving module 214 for receiving information related to images. For example, the module 214 handles receiving images from the image capture devices 104, or image-related data sources. In some implementations, the receiving module also receives processed images from the GPUs 202-4 for rendering on the display 116;
  - a transmitting module 218 for transmitting image-related information. For example, the module 218 handles transmission of image-related information to the GPUs 202-4, the display 116, or the image capture devices 104;
  - a 3-D model generation module 220 for generating 3-D models based on images collected by the image capture devices 104. In some implementations, the 3-D model generation module 220 includes a structure from motion module;
  - a pose identification module 222 that identifies poses (e.g., the poses 112-2, . . . , 112-16). In some implementations, the pose identification module uses identifiers in the image related data obtained from the image capture devices 104;
  - a pose selection module 224 that selects a plurality of poses from the identified poses identified by the pose identification module 222. The pose selection module 224 uses information related to tracking states for the poses, or perspective selected by a user;
  - a scale calculation module 226 that calculates scaling factor (as described below in reference to FIGS. 3A-3O, according to some implementations);
  - a measurements module 228 that calculates measurements of dimensions of a building structure (e.g., walls, dimensions of doors of the house 102) based on scaling the 3-D model generated by the 3-D model generation module 220 and the scaling factor generated by the scale calculation module 226; and
  - optionally, a lighting or illumination module 230 that adds lighting or illumination to images sampled or generated by the 3-D model generation module 220; and
- one or more server database of 3-D representation related data 232 (sometimes called image-related data) storing data for 3-D reconstruction, including but not limited to:
  - a database 234 that stores image data (e.g., image files captured by the image capturing devices 104);
  - a database 236 that stores world map data 236, which may include pose data 238, tracking states 240 (e.g., valid/invalid data, confidence levels for (validity of) poses or image related data received from the image capturing devices 104), or environment data 242 (e.g., illumination data, such as ambient lighting);
  - measurements data 244 for storing measurements of dimensions calculated by the measurements module 228; or
  - 3-D models data 246 for storing 3-D models generated by the 3-D model generation module 220.

The above description of the modules is only used for illustrating the various functionalities. In particular, one or more of the modules (e.g., the 3-D model generation module 220, the pose identification module 222, the pose selection module 224, the scale calculation module 226, the measurements module 228) may be combined in larger modules to provide similar functionalities.

In some implementations, an image database management module (not shown) manages multiple image repositories, providing methods to access and modify image-related data 232 that can be stored in local folders, NAS or cloud-based storage systems. In some implementations, the image database management module can even search online/offline repositories. In some implementations, offline requests are handled asynchronously, with large delays or hours or even days if the remote machine is not enabled. In some implementations, an image catalog module (not shown) manages permissions and secure access for a wide range of databases.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Although not shown, in some implementations, the computing device 108 further includes one or more I/O interfaces that facilitate the processing of input and output associated with the image capture devices 104 or external server systems (not shown). One or more processors 202 obtain images and information related to images from image-related data 274 (e.g., in response to a request to generate measurements for a building structure, a request to generate a 3-D representation with illumination), processes the images and related information, and generates measurements or 3-D representations. I/O interfaces facilitate communication with one or more image-related data sources (not shown, e.g., image repositories, social services, or other cloud image repositories). In some implementations, the computing device 108 connects to image-related data sources through I/O interfaces to obtain information, such as images stored on the image-related data sources.

Figure 2B:
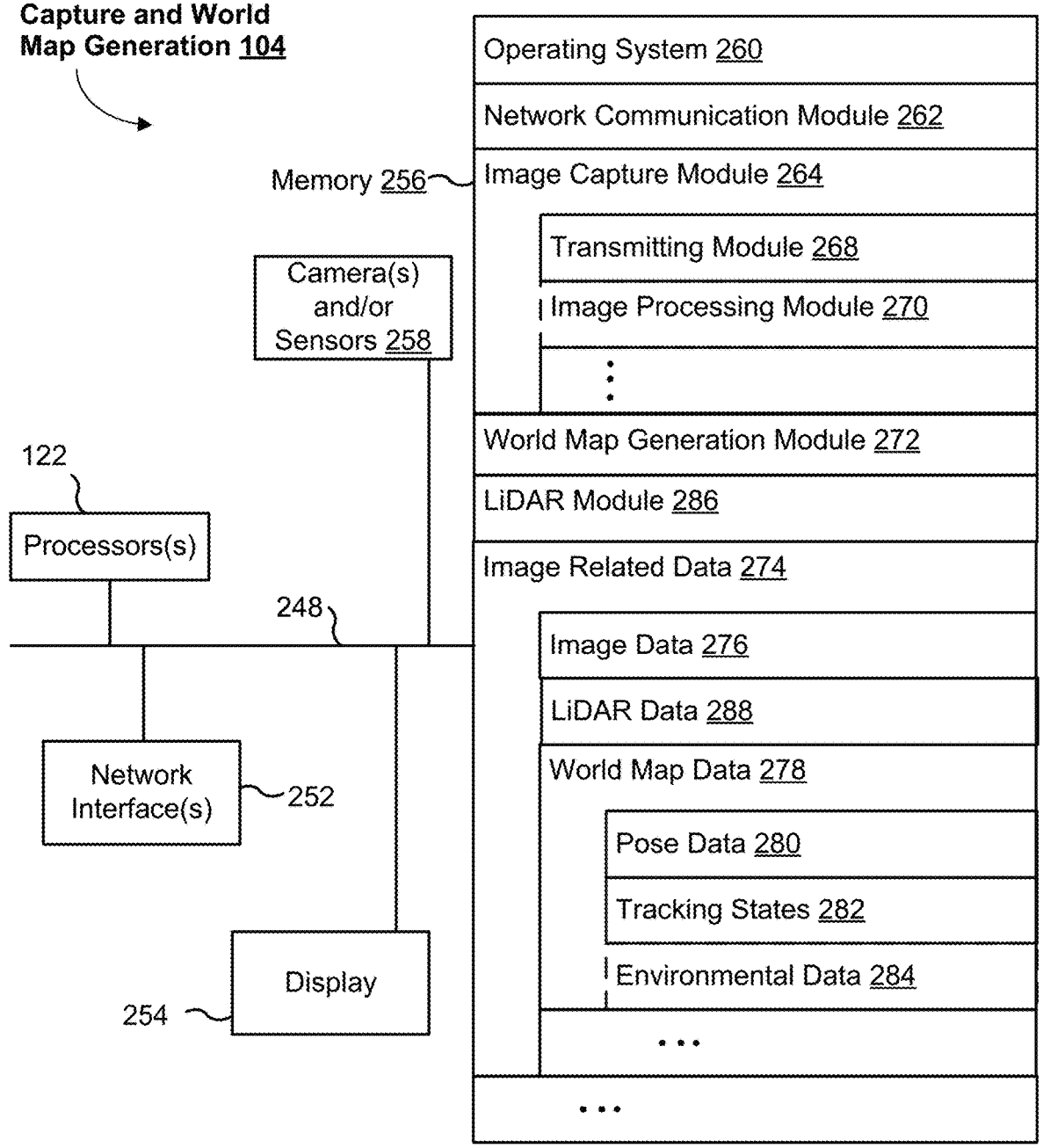
FIG. 2B is a block diagram of a device capable of capturing images and obtaining world map data, in accordance with some implementations.

FIG. 2B is a block diagram illustrating a representative image capture device 104 that is capable of capturing (or taking photos of) images 276 of building structures (e.g., the house 102) and running an augmented reality framework from which world map data 278 may be extracted, in accordance with some implementations. The image capture device 104, typically, includes one or more processing units (e.g., CPUs or GPUs) 122, one or more network interfaces 252, memory 256, optionally display 254, optionally one or more sensors (e.g., IMUs), and one or more communication buses 248 for interconnecting these components (sometimes called a chipset).

Memory 256 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 256, optionally, includes one or more storage devices remotely located from one or more processing units 122. Memory 256, or alternatively the non-volatile memory within memory 256, includes a non-transitory computer readable storage medium. In some implementations, memory 256, or the non-transitory computer readable storage medium of memory 256, stores the following programs, modules, and data structures, or a subset or superset thereof:
- an operating system 260 including procedures for handling various basic system services and for performing hardware dependent tasks;
- a network communication module 262 for connecting the image capture device 104 to other computing devices (e.g., the computing device 108 or image-related data sources) connected to one or more networks 110 via one or more network interfaces 252 (wired or wireless);
- an image capture module 264 for capturing (or obtaining) images captured by the device 104, including, but not limited to:
    - a transmitting module 268 to transmit image-related information (similar to the transmitting module 218); and
- an image processing module 270 to post-process images captured by the image capturing device 104. In some implementations, the image capture module 270 controls a user interface on the display 254 to confirm (to the user 106) whether the captured images by the user satisfy threshold parameters for generating 3-D representations. For example, the user interface displays a message for the user to move to a different location so as to capture two sides of a building, or so that all sides of a building are captured;
- a world map generation module 272 that generates world map or environment map that includes pose data, tracking states, or environment data (e.g., illumination data, such as ambient lighting);
- optionally, a Light Detection and Ranging (LiDAR) module 286 that measuring distances by illuminating a target with laser light and measuring the reflection with a sensor; or
- a database of image-related data 274 storing data for 3-D reconstruction, including but not limited to:
    - a database 276 that stores one or more image data (e.g., image files);
    - optionally, a database 288 that stores LiDAR data; and
    - a database 278 that stores world maps or environment maps, including pose data 280, tracking states 282, or environmental data 284.

Examples of the image capture device 104 include, but are not limited to, a handheld computer, a wearable computing device, a personal digital assistant (PDA), a tablet computer, a laptop computer, a cellular telephone, a smartphone, an enhanced general packet radio service (EGPRS) mobile phone, a media player, a navigation device, a portable gaming device console, a tablet computer, a laptop computer, a desktop computer, or a combination of any two or more of these data processing devices or other data processing devices. In some implementations, the image capture device 104 is an augmented-reality (AR)-enabled device that captures augmented reality maps (AR maps, sometimes called world maps). Examples include Android devices with ARCore, or iPhones with ARKit modules.

In some implementations, the image capture device 104 includes (e.g., is coupled to) a display 254 and one or more input devices (e.g., camera(s) or sensors 258). In some implementations, the image capture device 104 receives inputs (e.g., images) from the one or more input devices and outputs data corresponding to the inputs to the display for display to the user 106. The user 106 uses the image capture device 104 to transmit information (e.g., images) to the computing device 108. In some implementations, the computing device 108 receives the information, processes the information, and sends processed information to the display 116 or the display of the image capture device 104 for display to the user 106.

Example Model Reconstruction and Display Using Augmented Reality Frameworks

Scaling 3-D representations, as described above, may be through orthographic image checks or architectural feature analysis. Scaling factors with such techniques utilize image analysis or external factors, such as aerial image sources or industrial standards that may be subjective to geography. In this way, determining scale may occur after processing image data and building a model. In some implementations the camera information itself may be used for scaling without having to rely on external metrics. In some implementations, scale based on orthographic imagery or architectural features can adjust camera information scaling techniques (as described herein), or said techniques can adjust a scaling factor otherwise obtained by orthographic or architectural feature techniques.

Some implementations use augmented reality frameworks, such as ARKit or ARCore, for model reconstruction and display. In some implementations, camera positions, as identified by its transform, are provided as part of a data report (for example, a cv.json report for an image) that also includes image-related data. Some implementations also use data from correspondences between images or features within images, GPS data, accelerometer data, gyroscope, magnetometer, or similar sensor data. Some implementations perform object recognition to discern distinct objects and assign identifiers to objects (sometimes called anchors or object anchors) to establish correspondence between common anchors across camera poses.

In some implementations, as part of the image capture process, a camera (or a similar device) creates anchors as salient positions, including when the user presses the camera shutter and takes an image capture. At any given instant, the augmented reality framework has the ability to track all anchors visible to it in 3-D space as well as image data associated with that instant in a data structure. Such a data structure represents tracked camera poses, detected planes, sparse feature points, or other data using cartesian coordinate systems; herein after such data structures or portions thereof are referred to as a world map though not limiting on specific formats and various data compositions may be implemented. In some implementations, the anchors and the associated data are created by the camera, and, in some instances, implicitly created, like detected vertical and horizontal planes. In some implementations, at every image position, the world map is stored as a file (e.g., the anchor positions are written to a cv.json as described above) or to memory (e.g. processed by the capture device directly rather than serially through a file). Some implementations create a map of all anchors, created for different positions. This allows the implementations to track the relative displacement between any two positions, either individually at each position or averaged over all positions. Some implementations use this technique to account for any anchor drift (e.g., drifts inherent in a visual inertia odometry VIO system used by ARKit for visual tracking). In some implementations, this technique is used to ignore anchor pairs where tracking was lost or undetermined between positions. Some implementations discard anchor positions that are not consistent with other positions for the same anchor identifier.

Some implementations calculate (or estimate) a scale of the model (based on captured images) based on the camera poses provided by the augmented reality frameworks. Some implementations use estimated distances between the camera poses. Some implementations estimate relative camera positions, followed by scaling to update those camera positions, and use the techniques described above to derive the final camera positions and then fit the model geometry to that scale. Scaling factors, then, can be determined concurrent with image capture or concurrent with constructing a 3-D representation.

Some implementations use tracking states provided by augmented reality frameworks. Some frameworks provide "good tracking" and "low tracking" values for camera poses. In some instances, camera poses have low tracking value positions. Although the tracking states can be improved (e.g., a user could hold the camera in a position longer before taking a picture, a user could move the camera to a location or position where tracking is good), the techniques described herein can implement scale factor derivation regardless of tracking quality. Some implementations establish the correspondence among camera positions, e.g. at least two, to get scale for the whole model. For example, if two out of eight images have good tracking, then some implementations determine scale based on the camera data for those two images. Some implementations use the best 2 of the package (e.g., regardless of whether the 2 correspond to "good tracking" or "low tracking" or "bad tracking" states).

In some instances, when the augmented reality framework starts a session and begins a world map, anchors can shift between successive captures. The visual tracking used by the frameworks contribute to the drift. For example, ARKit uses VIO that contributes to this drift. In many situations, the drift is limited, and is not an appreciable amount. Some implementations make adjustments for the drift. For example, when there are photos taken that circumvent a home, a minimum number of photos (e.g., 8 photos) are used. In this example, the first anchor (corresponding to the first pose) undergoes 7 shifts (one for each successive capture at a pose), the second anchor (corresponding to the second pose) undergoes 6 shifts, and so on. Some implementations average the anchor positions. Some implementations also discard positions based on various metrics. For example, when tracking is lost, the positional value of the anchor is inconsistent with other anchors for the same identifier, the session is restarted (e.g., the user received a phone call), some implementations discard the shifted anchors. Some implementations use positions of two camera poses (e.g., successive camera positions) with "good tracking" scores (e.g., 0 value provided by ARKit).

Some implementations use three camera poses (instead of two camera poses) when it is determined that accuracy can be improved further over the baseline (two camera pose case). Some implementations recreate a 3-D model, and when displaying the 3-D model, depending on where the render camera is at a given time, retrieve the illumination data for the nearest anchor or camera pose, display the pixels for the model based on that anchor's data. Some implementations average based on two bracketing anchors, or apply weighted average.

Using Structure from Motion Techniques for Pose Selection

Some implementations use Structure from Motion (SfM) techniques to generate additional poses and improve pose selection or pose estimation. Some implementations use SfM techniques in addition to applying one or more filtering methods on AR real-world cameras to select or generate increased reliable candidate poses. The filtering methods for selecting candidate poses or dismissing inaccurate real-world poses described elsewhere in this disclosure are prone to errors when there are very few camera poses to choose from. For example, if there are only eight camera poses from a sparse capture, the risk of no consecutive camera pairs meeting the ratio expressions increases due to known complications with wide-baseline datasets. The SfM techniques improve pose selection in such circumstances. By providing more images, and less translation between them, more precise poses (relative and real-world) are generated. SfM techniques, therefore, improve reliability of AR-based tracking. With more camera poses, filtering out camera poses is not detrimental to sourcing candidate poses that may be used for deriving a scale factor, as there are more real-world poses eligible to survive a filtering step.

Figure 1E:
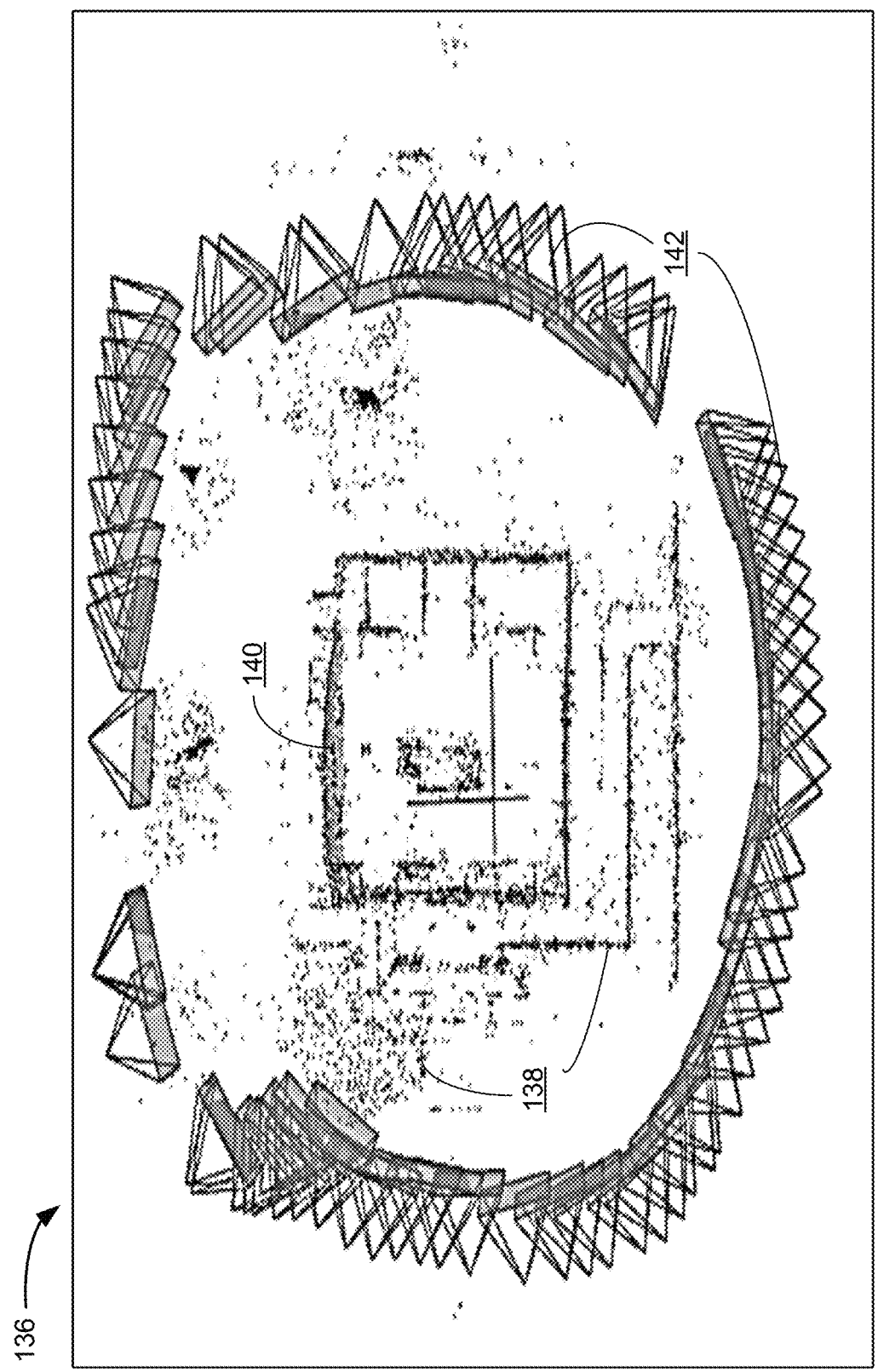
FIG. 1E shows an example reconstruction of a building structure, and recreation of a point cloud, in accordance with some implementations.
Figure 1F:
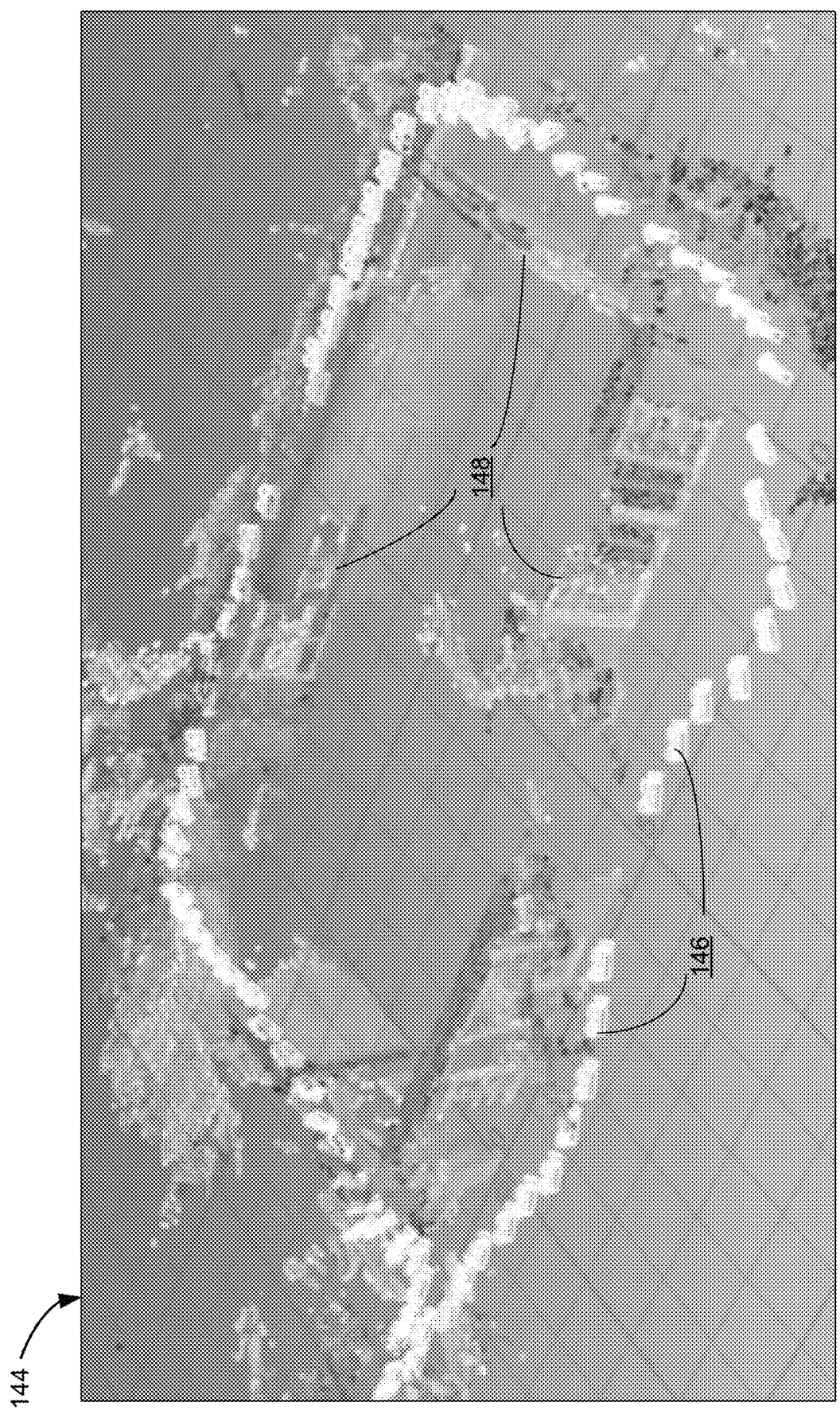
FIG. 1F shows an example representation of LiDAR output data for a building structure, in accordance with some implementations.
Figure 1G:
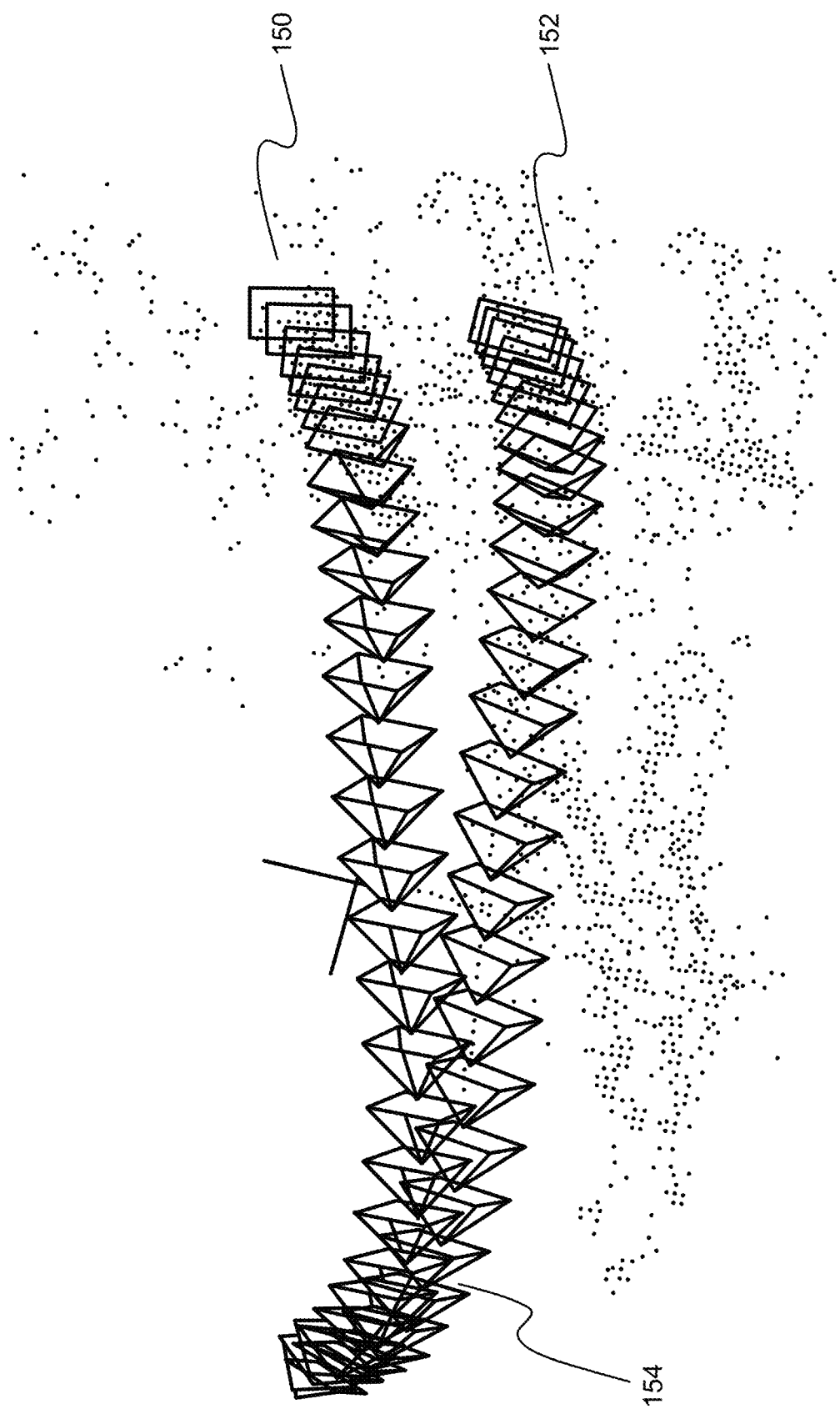
FIG. 1G shows an example dense capture camera pose path comparison with dense AR camera pose path, in accordance with some implementations.

Some implementations compare a shape of the AR camera path to a shape of SfM solve. In such a technique, where translation changes between cameras may be quite small and satisfying a ratio or a tolerance margin of error to substantially satisfy a ratio is easier, errant path shapes may discard real-world poses. FIG. 1G illustrates this path comparison. SfM camera solve path 150 illustrates the dense camera solve that a SfM collection can produce, such as from a video or frequent still images. When compared to the AR camera path 152, the translation changes between frames is very small and may satisfy the ratio relationships described elsewhere in this disclosure despite experiencing obvious drift from the SfM path. In some implementations, the SfM camera solution is treated as a reference pose solution and used as a ground truth for AR framework data or real-world pose information otherwise. Path shape divergence, such as is observable proximate to pose 154, or irregular single real-world camera position otherwise may be used to discard real-world poses from use as candidate poses for scale or reconstruction purposes. In this sense, translation distance comparisons are not used, but three dimensional vector changes between real-world poses can disqualify real-world poses if the real-world poses are not consistent with vector direction changes between corresponding reference poses.

Some implementations obtain a video of a building structure. For example, a user walks around a tight lot line to capture a video of a wall that the user wants to measure. In some instances, the video includes a forward trajectory as well as a backward trajectory around the building structure. Such a technique is a "double loop" to ensure complete coverage of the imaged object; for example, a forward trajectory is in a clockwise direction and a backward trajectory is in a counter-clockwise direction about the house being imaged. In some instances, the video includes a view of a capture corridor around the building structure with guidance to keep the building structure on one half of the field of view so as to maximize correspondences between adjacent frames of the video.

Figure 1H:
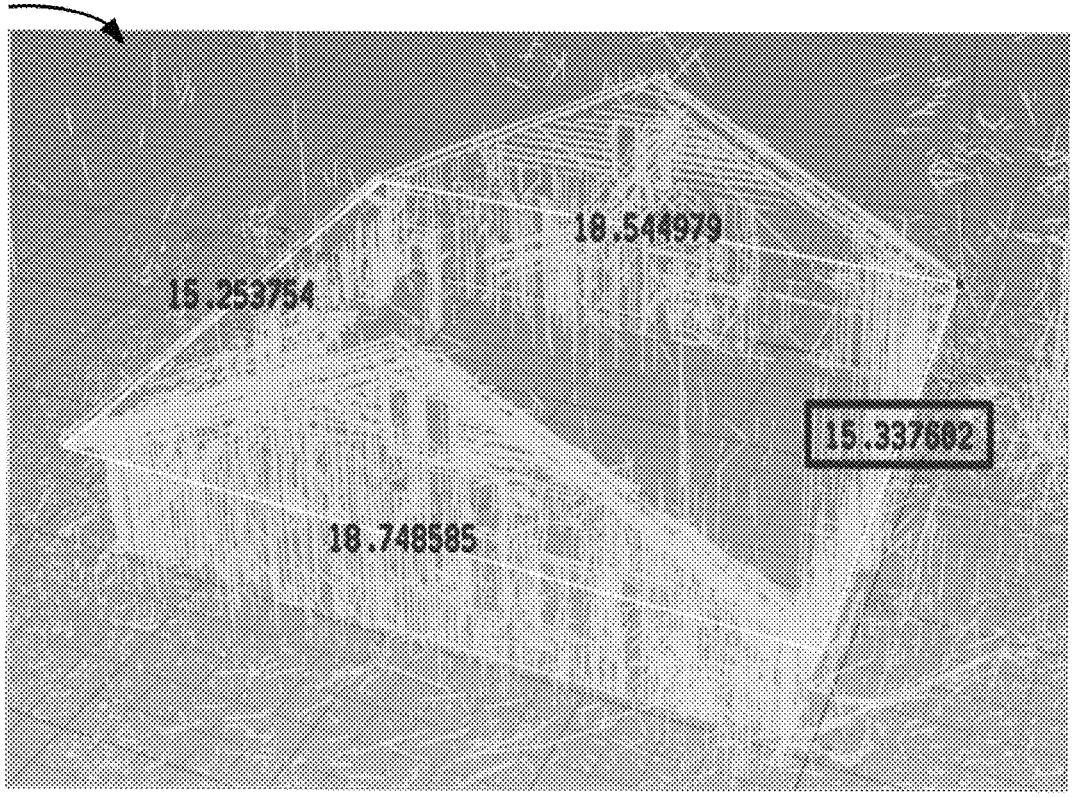
FIG. 1H shows a line point reconstruction and pseudo code output for inlier candidate pose selection, in accordance with some implementations.

Some implementations perform a SfM solve to obtain a dense point cloud from the video. Some implementations scale the dense point cloud using output of AR frameworks. FIG. 1H illustrates a building model 156 reconstructed from SfM techniques, depicting a cloud of linear data, according to some implementations. Some implementations couple the point cloud with real-world poses from corresponding AR framework output to determine measurements of the point cloud based on a scale determined by the real-world poses correlated with the reference poses of the SfM reconstruction. The measurements may be presented as part of the point cloud as in FIG. 1H to provide earlier feedback without building an entire model for the building.

In some implementations, a reconstructed model based on the visual data only or reference poses could then be fit through x, y, z and pitch, roll, yaw movements to align the model to the scaled point cloud, thus assigning the model the scale factor of the point cloud.

Entire models need not be generated with these techniques. Some implementations may generate only a model for the building footprint based on the generated point cloud, and fit scaled lines to the footprint based on the AR output. A convex hull is one such line fitting technique to generate a point cloud footprint. Such implementations produce ready square footage or estimated living area dimensions for a building. Some implementations refine the initial footprint based on the video frames, and raise planar geometry according to the AR output gravity vector to form proxy walls, take measurements, and repeat the process until relevant features of the building structure are measured. Some implementations reconstruct a single plane of a building with the aforementioned dense capture techniques, and use sparse capture methods for the remainder of the building. The scale as derived from the single wall can be assigned to the entire resultant 3-D building model even though only a portion of its capture and reconstruction was based on the dense techniques or AR scaling framework.

The dense amount of data depicted in FIG. 1H reflects the large amount of camera positions and data involved to generate such a feature dense representation. With such a large amount of camera poses, some implementations use a statistical threshold analysis (e.g. least median squares operation) to identify inlier camera poses suitable for selecting scaling factors via candidate poses. In some implementations, this is a pre-processing step. This uses the real-world poses that conform to a specified best fit as defined by the reference poses on the whole. Some implementations select, from among all the poses, corresponding consecutive reference pose pairs and consecutive real-world pose pairs and scale the underlying imaged building according to the resultant scale as determined by those pairs (such as derived using the aforementioned techniques). Camera pairs that produce scaled models outside of a statistical threshold relative to other camera pair sample selections are dismissed, and only camera pair samples that scale within a threshold of the other camera pair samples are preserved as inliers. In some implementations, the resultant inlier real-world camera poses may then be used for the candidate pose selection techniques described above with respect to translation distance ratio expressions.

FIG. 1H further depicts pseudo code output 158 for a non-limiting example of executing a least median of squares analysis through LMedS image alignment processes to impose the best fit constraint from the reference poses generated by a SfM solve to corresponding real-world poses generated by an AR framework. As shown in FIG. 1H, this produces 211 inlier real-world camera poses from an initial 423 poses generated by the AR framework. Also noted in FIG. 1H, least mean of squares analyses or other standard deviation filtering means are suitable as well to filter obvious outliners from an initial large dataset. Some implementations employ random sample consensus to achieve similar inlier generation. It will be appreciated as well that use of LMedS or RANSAC may inform whether there are enough reference and real-world poses in the total data set to produce a reliable inlier set as well, or how many images should be taken to generate the pool of poses in the first place. This can be accomplished by establishing an outlier efficiency parameter, ε, within the LMedS method, and solving for the number of samples that must be captured to obtain a desired number of data points. Some implementations operate with an outlier efficiency of greater than 50%, on the basis that if more than half of the real-world poses are inliers there is at least one consecutive pair that may be used for scaling. Some implementations assume that at least two data points are needed to derive the scale (e.g. to produce the distance between two candidate poses). According to LMedS, and the following equation, $$\text{poses needed} = \log(1-P)/\log(1-(1-\varepsilon)^2)$$

where P represents the degree features must be co-visible among images, at least 16 poses would need to be collected under such parameters to ensure sufficient inliers for candidate pose generation. Some implementations assume a value of P=0.99 to ensure high probability of co-visible features, and as P approaches 1 (e.g., perfect feature matching across images), the number of poses required exponentially increases. As structural complexity or size of the building increases, outlier efficiency increases as more real-world poses are expected to fail due to sensor drift, thereby increasing the number of poses required as input and the nature of a capture session. By way of example, a change to an outlier efficiency of 75% increases the number of sub-samples needed to 72. In some implementations, the parameters are adjusted and this "number of required poses" prediction may serve as a guidance input prior to image capture, or during image capture if any one frame produces a low number of non-camera anchor features, or adjust a frame rate of an imager to ensure sufficient input while minimizing computing resources and memory by limiting excessive image capture and pose collection. For example, a device set to gather images at a frame rate of 30 fps (frames per second) may down cycle to 1 frame per second or even 1 frame per 5 seconds to reduce the amount of data processed by the system while still capturing enough images to stay above the number of subsamples needed to produce a reliable inlier set. As discussed above, simple structures may need as few as 16 images and dense video capture would need extremely low frame rates to gather such image quantities. Circumventing such simple structures with a video imagers may only take 60 seconds, corresponding to an adjusted frame rate of 0.27 fps.

Such inlier identification can further directly attribute reference poses (whether by image feature triangulation such as SLAM or structure from motion camera generation) to world coordinates, further enabling geo-locating the resultant model within a map system like WGS-84, latitude and longitude, etc.

Most AR framework applications intend to use as many real-world poses as possible for the benefit of the increased data and would not use the data culling or filtering steps described herein, whether inlier identification or candidate pose selection. The large distances involved in modeling buildings, however, and the variability in features available in frames during such a large or long AR session, present a unique use case for this sort of output and filtering such as the inlier step makes pose selection for follow on operations more efficient.

Other pose filtering methods may include discarding pairs of poses nearest to the building relative to other pairs, or discarding the pair of poses that have the fewest features captured within their respective fields of view. Such poses are more likely to involve positional error due to fewer features available for tracking or localization. Further, as drift in sensor data compounds over an AR session, some implementations use real-world poses from earlier in an AR output or weight those camera more favorably in a least median squares analysis. Very large objects may still be captured using AR frameworks then, but which real-world poses of that AR framework may be biased based on the size of the building captured, number of frames collected in the capture, or temporal duration of the capture.

Some implementations use camera poses output by the SfM process to select candidate poses for AR-based scaling. Some implementations use a dense capture of a building structure that collects many more image frames (not necessarily by video), and recreates a point cloud of the object by SfM. With the increased number of frames used for reconstruction, more AR data is available for better selection of anchor sets for scale determination. FIG. 1E shows an example reconstruction 136 of a building structure 140, and recreation of a point cloud 138, based on poses 142, according to some implementations. In some implementations, the poses 142 are used for selecting candidate poses from the real-world poses obtained from an AR camera. It will be appreciated that while FIG. 1E depicts complete coverage, dense capture techniques generate many reference poses and real-world poses, and only sections of the captured building may need to be captured by such techniques in order to derive a scaling factor.

In some instances, building structures or properties include tight lot lines, and image capture does not include some perspectives. For example, suppose a user stands 10 meters back from an object and takes a picture using a camera, then moves three feet to the side and takes another picture, some implementations recreate a point cloud of the object based on those two positions. But as a user gets closer to the object, then correspondence of or even identification of features within successive camera frames is difficult because fewer features are present in each frame. Some implementations address this problem by biasing the angle of the image plane relative to the object (e.g., angle the camera so that the camera points to the house at an oblique angle). The field of view of the camera includes a lot more data points and more data points that are common between frames. But, the field of view sometimes also gets background or non-property data points. Some implementations filter such data points by determining the points that do not move frame-to-frame, or filter data points that only move by a distance lower than a predetermined threshold. Such points are more likely to represent non-building features (further points will appear to shift less in a moving imager due to parallax effects). In this way, some implementations generate a resultant point cloud that includes only relevant data points for the object.

Using LIDAR for Improved Image Data

Some implementations overcome limitations with sparse images (e.g., in addition to filtering out images as described above) by augmenting the image data with LiDAR-based input data. Some implementations use active sensors on smartphones or tablets to generate the LiDAR data to provide a series of data points (e.g., data points that an AR camera does not passively collect) such that anchors in any one image increase, thereby enhancing the process of determining translation between anchors due to more data. Some implementations use LiDAR-based input data in addition to dense capture images to improve pose selection. Some implementations use the LiDAR module 286 to generate and store the LiDAR data 288.

In some implementations, AR camera provides metadata-like anchors as a data structure, or point cloud information for an input scene. In some implementations, the point cloud or world map is augmented with LiDAR input (e.g., image data structure is updated to include LiDAR data), to obtain a dense point cloud with image and depth data. In some implementations, the objects are treated as points from depth sensors (like LiDAR) or structure from motion across images. Some implementations identify reference poses for a plurality of anchors (e.g., camera positions, objects visible to camera). In some implementations, the plurality of anchors includes a plurality of objects in an environment for the building structure.

Some implementations obtain images and anchors, including camera positions and AR-detected anchors, and associated metadata from a world map, from an AR-enabled camera. Some implementations discard invalid anchors based on AR tracking states. Some implementations associate the identifiers in the non-discarded camera anchors against corresponding cameras, with same identifiers, on a 3-D model. Some implementations determine the relative translation between the anchors to calculate a scale for the 3-D model. In some instances, detecting non-camera anchors like objects and features in the frame is difficult (e.g., the world map may not register objects beyond 10 feet). Some implementations use LiDAR data that provides good resolution for features up to 20 feet away. FIG. 1F shows an example representation 144 of LiDAR output data for a building structure, according to some implementations. LiDAR output corresponds to camera positions 146, and can be used to generate point cloud information for features 148 corresponding to a building structure. As shown, LiDAR output can be used to generate high resolution data for features or extra features that are not visible, or only partially visible, to AR camera, and improves image data. With the extra features, some implementations predict translation between camera anchors and non-camera anchors, and from that translation change, select pairs of cameras with higher confidence.

Using Augmented Reality Frameworks for Illumination of 3-D Models of Buildings

Augmented reality frameworks, such as AR Kit or AR Core, enable the placing of 3-D and 2-D objects in a real world camera scene. In order to do this, the frameworks mimic the lighting and location conditions while rendering the object in context. This allows the object to be shaded appropriately with the correct ambient light intensity, color etc. For example, such frameworks can be used to recreate a bouncing 3-D ball on a kitchen dining table. Some implementations extend this concept by capturing the same data structures that represents these conditions as part of the data acquired during image capture so as to perform similar rendition at a later point in time and location. Some implementations use such techniques to render a 3-D object in context on a desktop viewer or place it in a scene that may or may not be represent the originally captured scene. For example, some implementations ensure sunlight effects are always rendered from back left of the 3-D model, despite the model being placed in the middle of an artificial lake. In some implementations, the captured environmental data in combination with the captured imagery is used to render a different or modified 3-D object in the same context. For example, some implementations render a 3-story building in place of the original single story ranch style home, while preserving the same lighting conditions. This type of context management is critical for rendering techniques like physically based rendering (PBR). In the absence of such data, a typical rendering engine can only make a reasonable guess on original conditions, or will make assumptions about original conditions based on current location.

Some augmented reality frameworks, such as AR Kit, are designed for concurrent display of a digital object with ambient world settings. In those circumstances, it is important to know where objects are, what light conditions are at the time of display. But, because such frameworks gather information in order to know how to display an AR object, some implementations use the same data to display that same scene with the relative camera pose data. In other words, a digital object's illumination is adjusted based on viewing perspective. Unlike conventional digital photography where digital image recreation is display of a digital scene at a time (time 2) different from when image data is collected (time 1) and the pixels are simply recreated, some implementations illuminate pixels (such as for 3-D models) based on time 1 data and time 2 perspective (where the lighting conditions are different). The distinctions are illustrated in the table below:

| Tool | Collection | | Display | |
| --- | --- | --- | --- | --- |
| | Location | Time | Location | Time |
| Digital photography | 1 | 1 | At [2] to appear the same as [1] | At [2] to appear the same as [1] |
| Augmented Reality | 1 | 1 | At [1] or [2] to appear the same as [1] | [1] |
| Techniques described here | 1 | 1 | 1 | 2 |

Some augmented reality frameworks produce a world map comprising a number of anchors, one of which can be camera positions, and data associated with that anchor (e.g., ambient light luminance at that anchor). Some implementations store the world map, and then apply the lighting information to a new object at a later time.

Some implementations recreate the model, and then when displaying it, wherever the render camera is at a given time, retrieve the illumination data for the nearest anchor/camera pose, and display the pixels for the model based on that anchor's data. Some implementations take an average based on the two bracketing anchors, or weighted average.

Figure 3A:
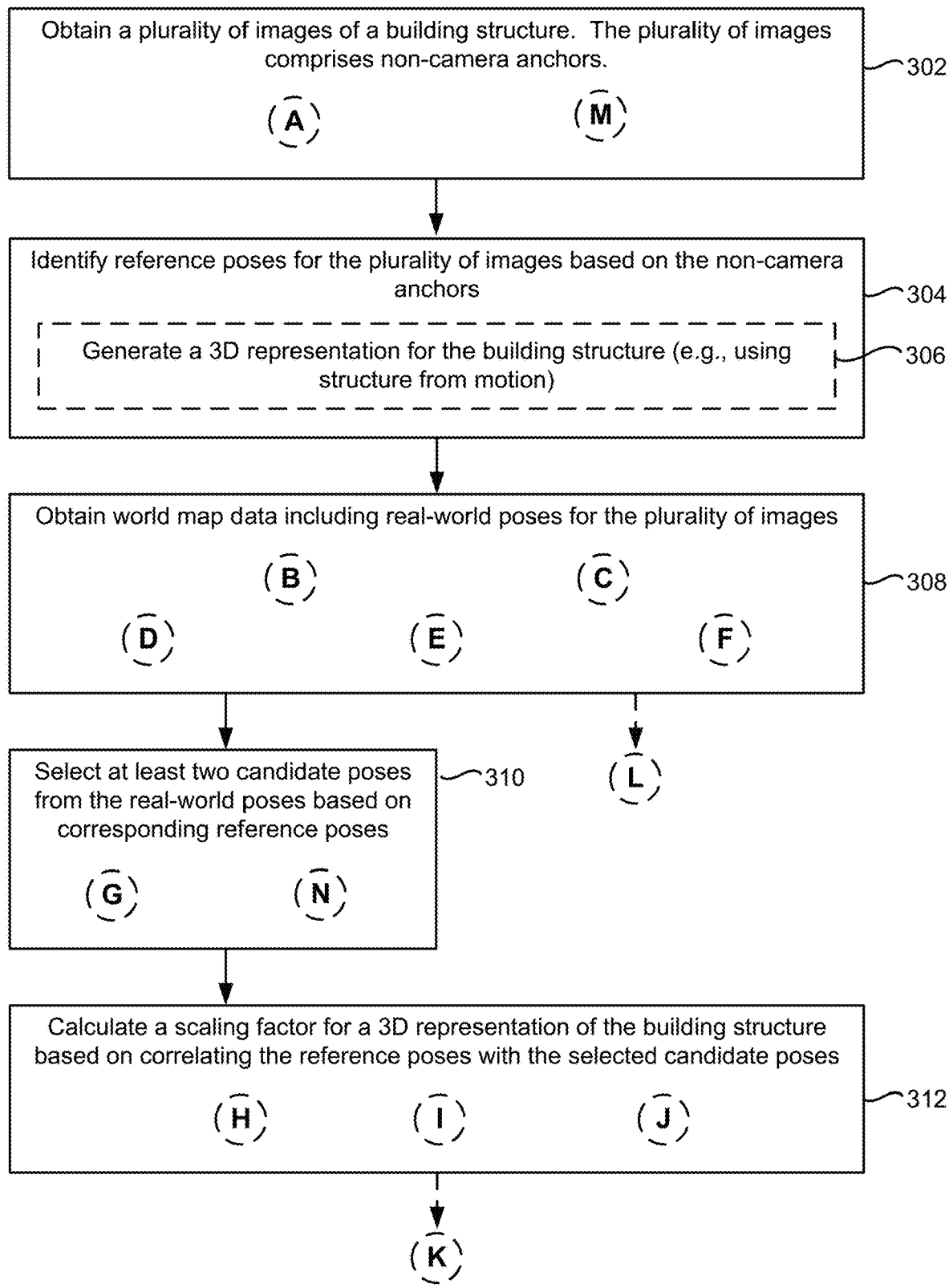
FIGS. 3A-3O provide a flowchart of a process for scaling 3-D representations of building structures, in accordance with some implementations.
Figure 3B:
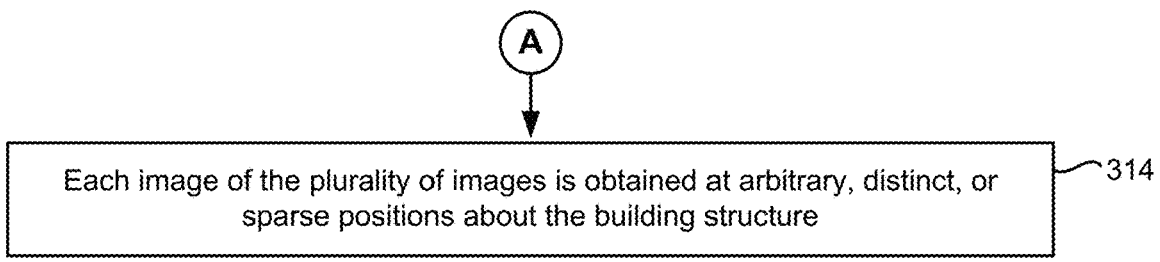
Figure 3C:
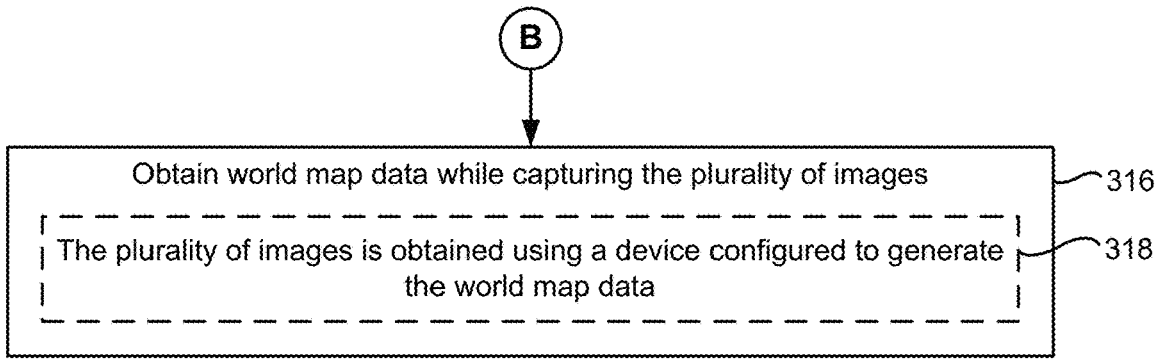
Figure 3D:
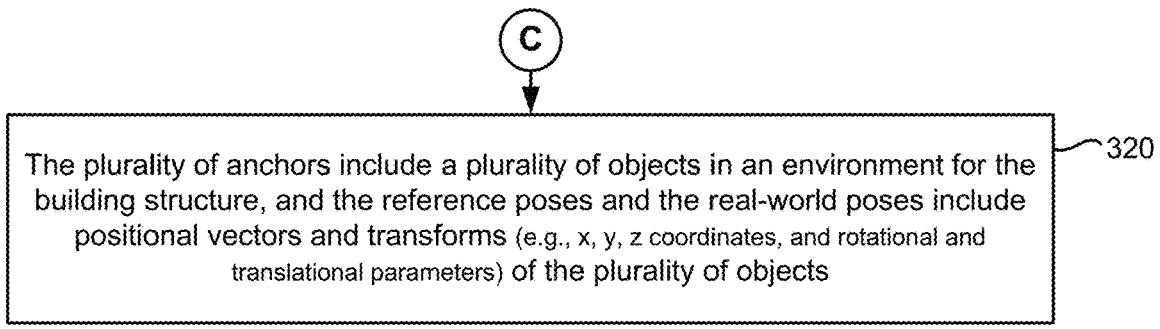
Figure 3G:
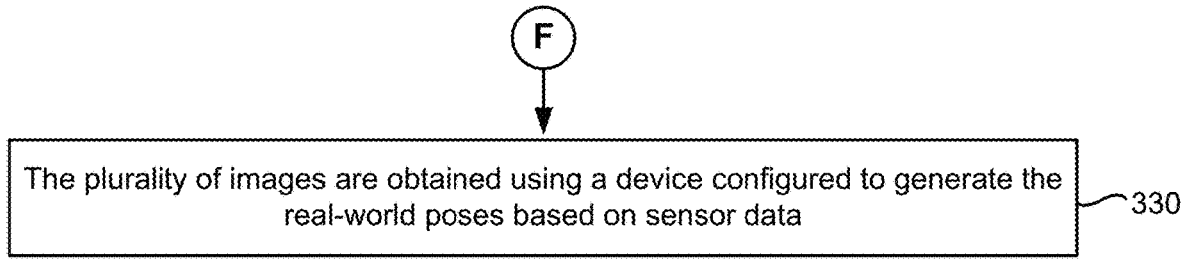
Figure 3H:
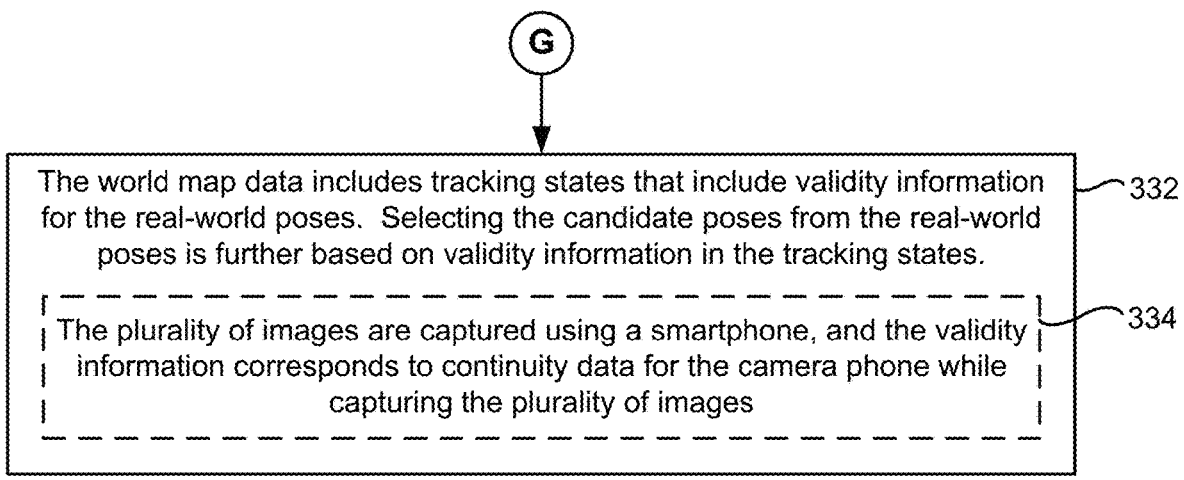
Figure 3I:
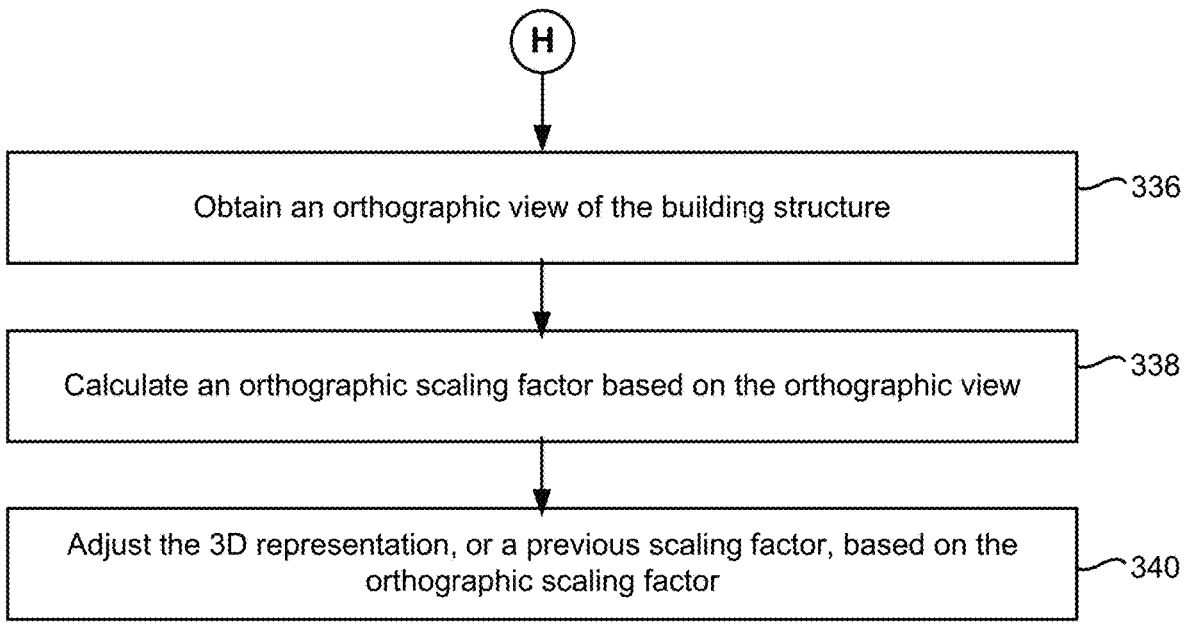
Figure 3J:
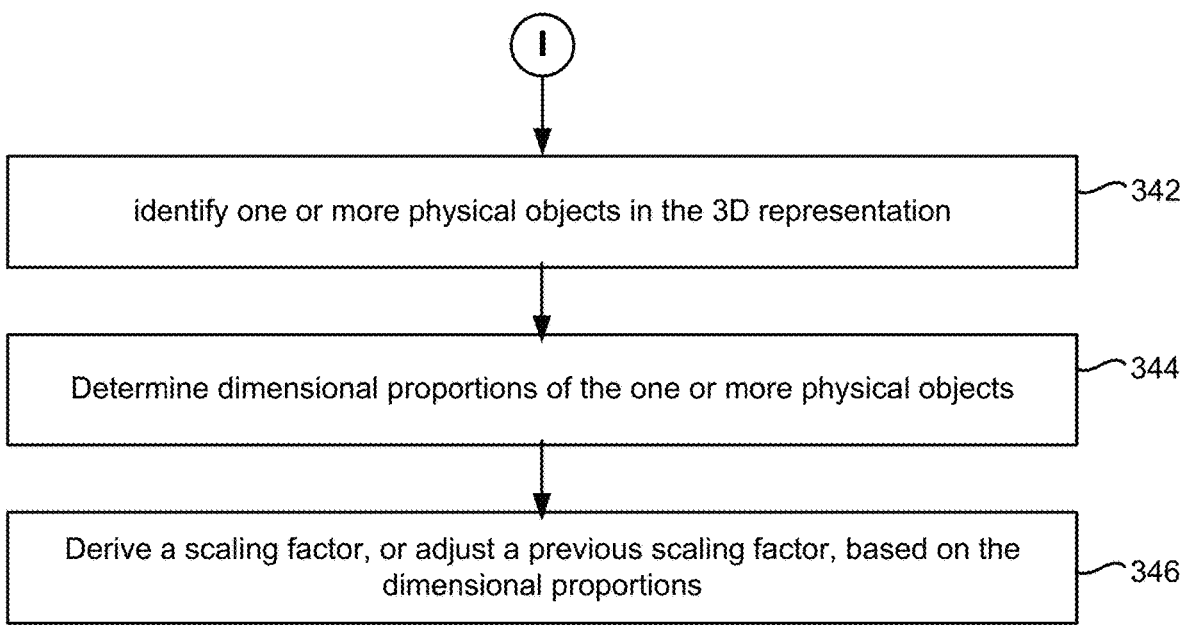
Figure 3K:
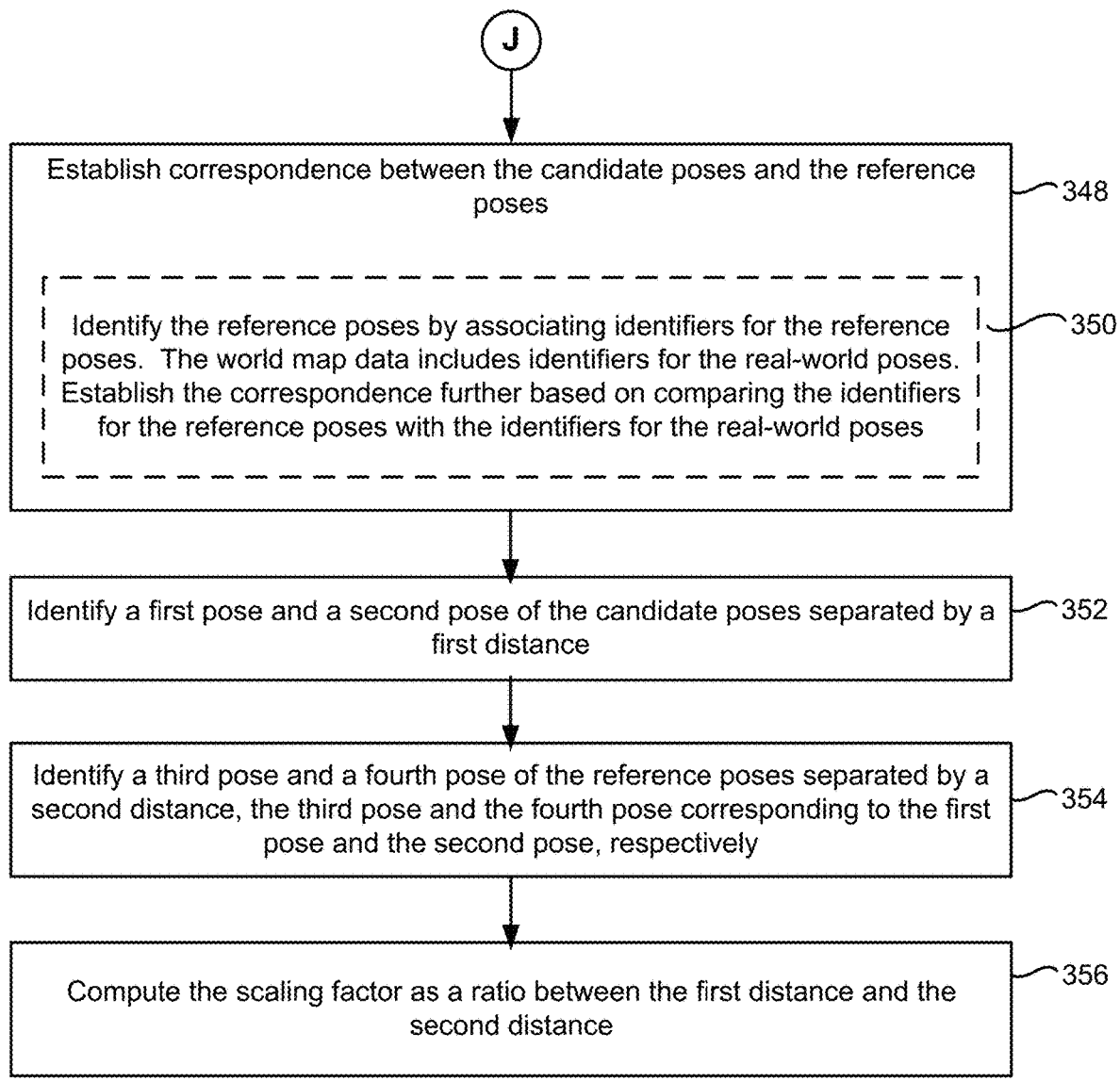
Figure 3L:
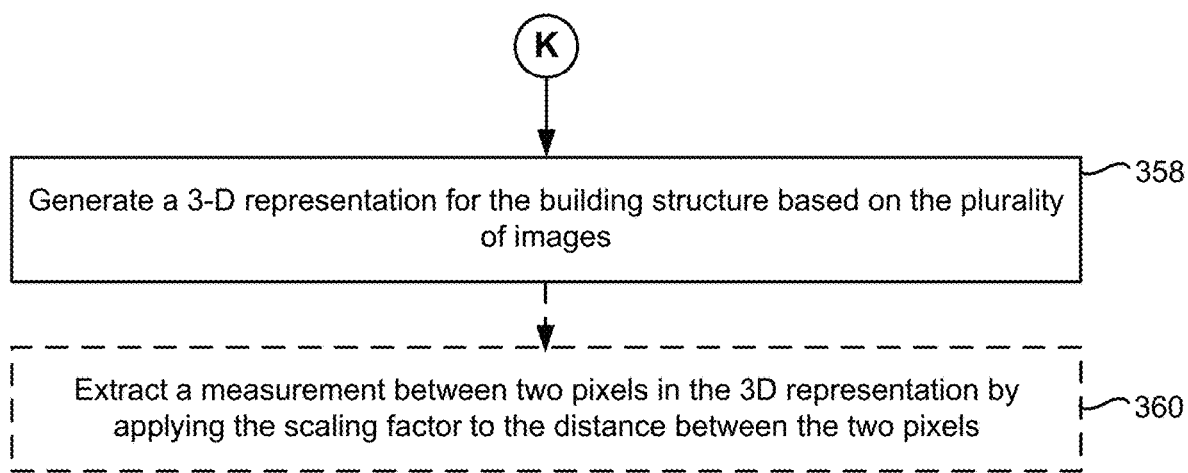
Figure 3M:
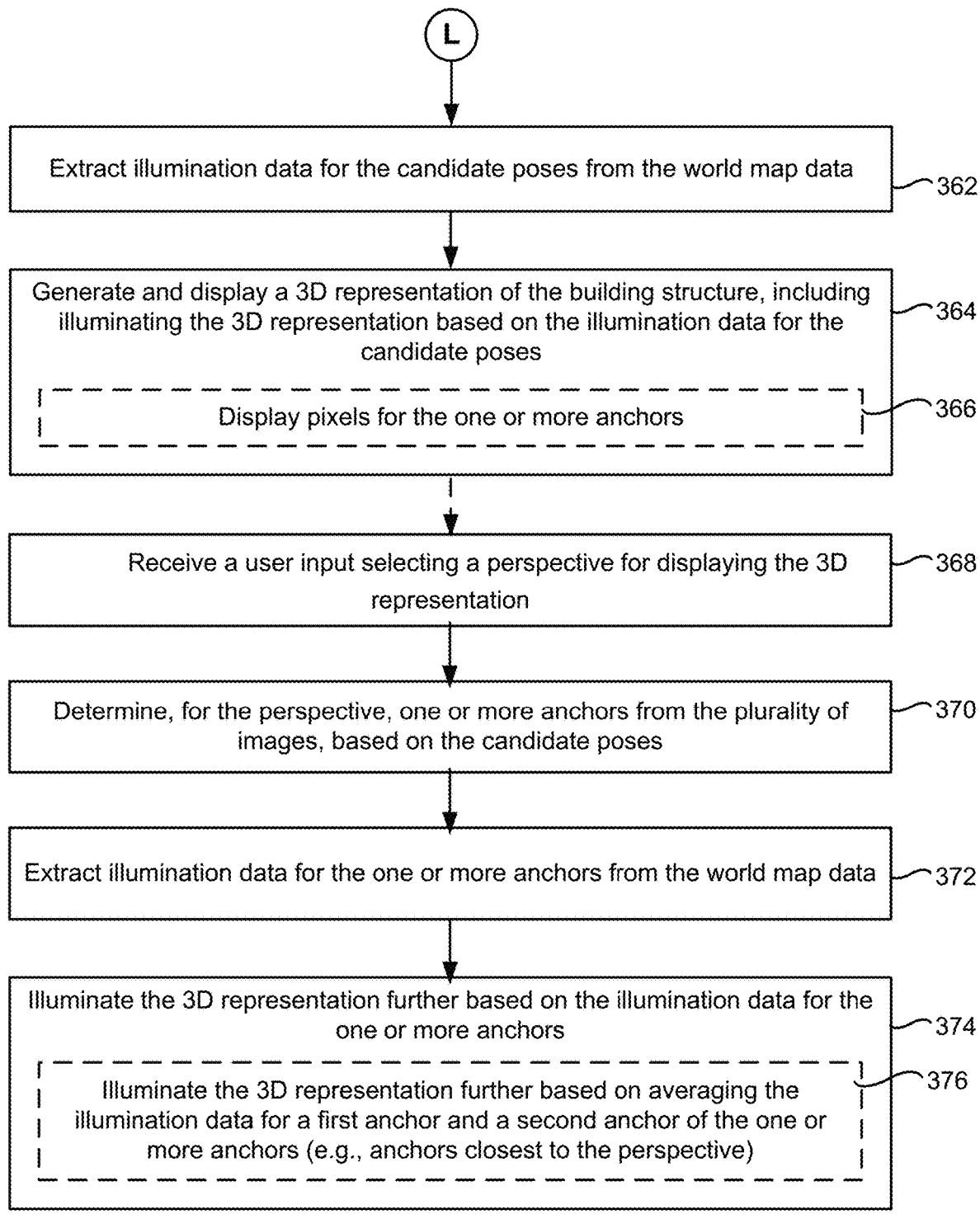
Figure 3N:
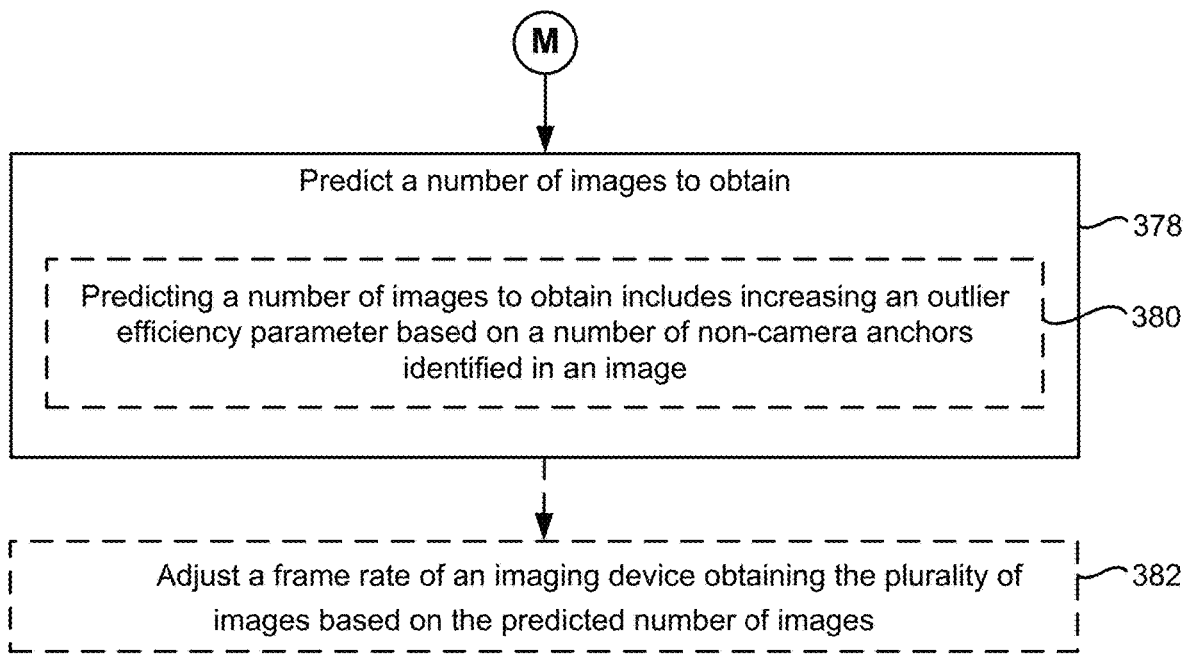
Figure 3O:
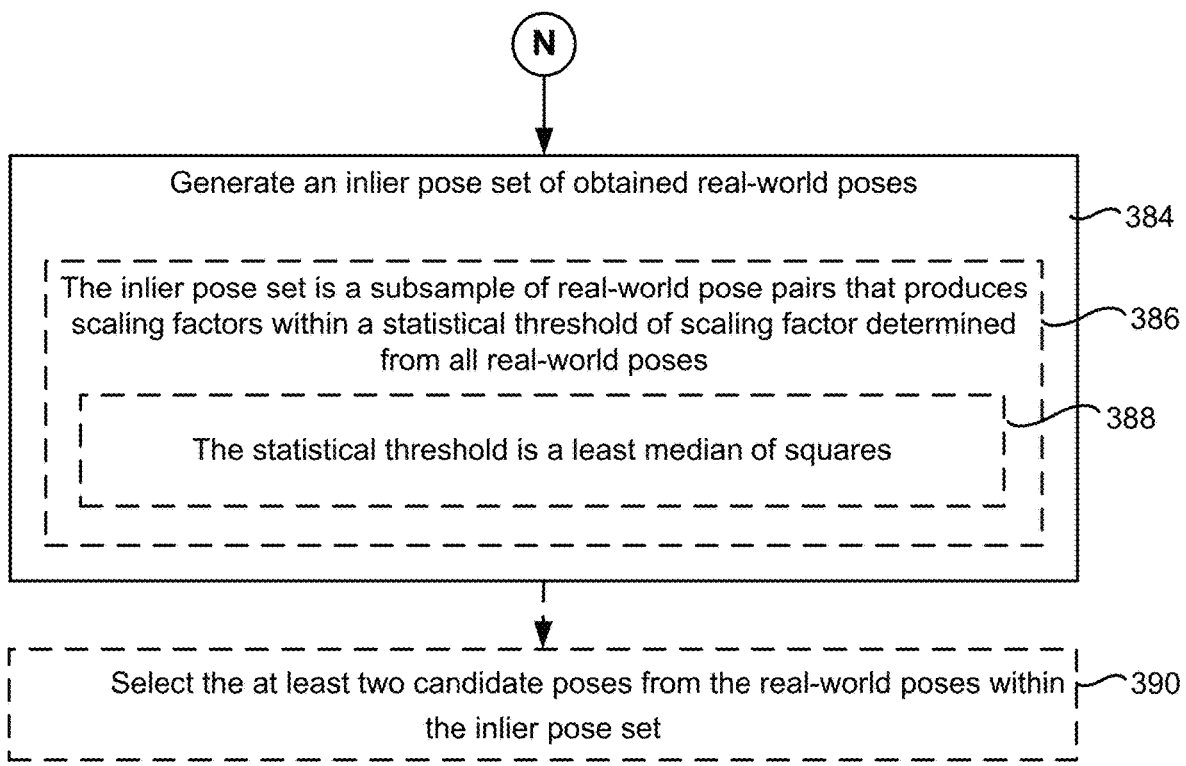
Figure 4:
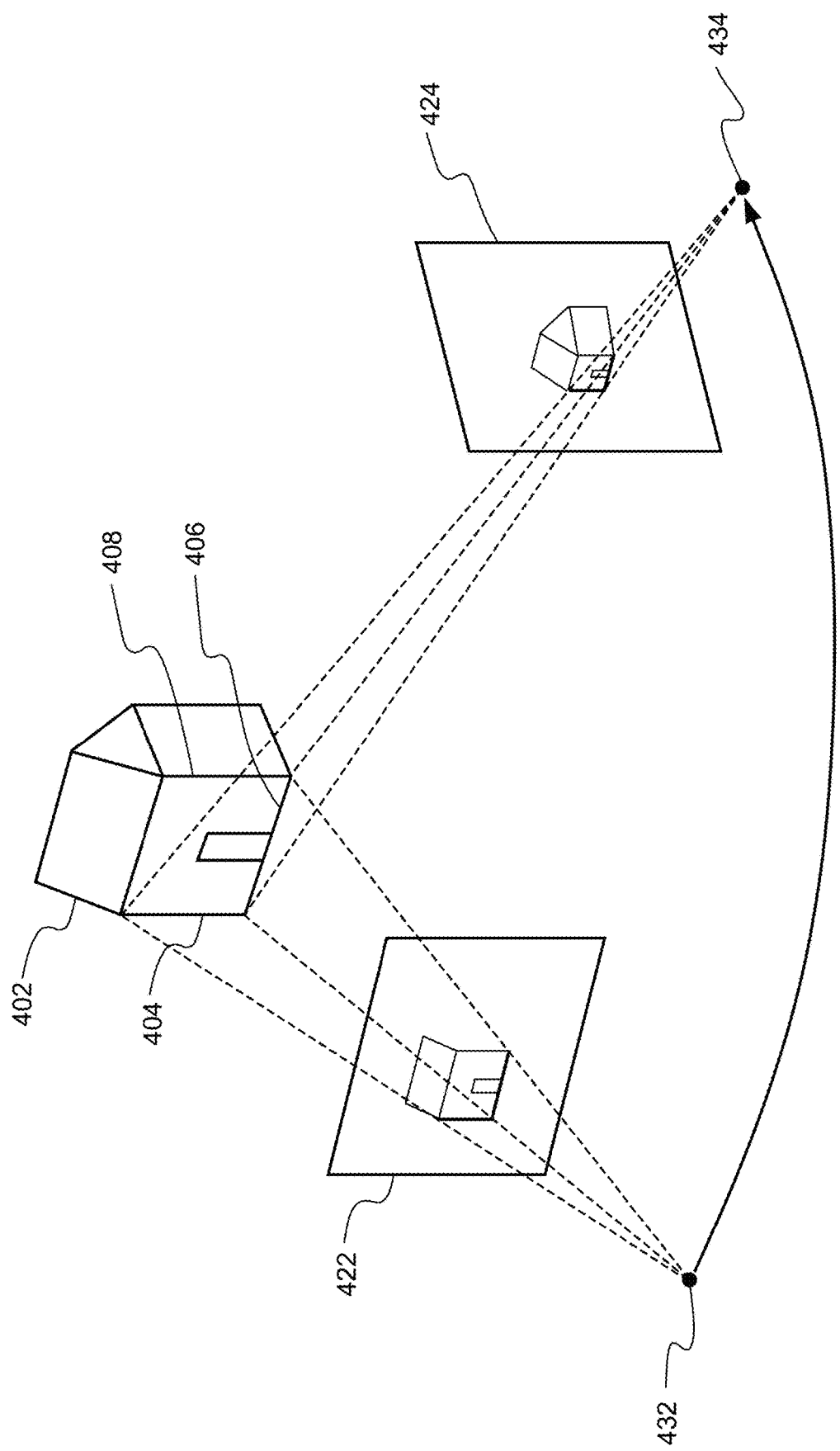
FIG. 4 illustrates deriving a camera position from features in captured image data, in accordance with some implementations.

Example Methods for Scaling or Illuminating 3-D Representations of Building Structures FIGS. 3A-3O provide a flowchart of a method 300 for scaling 3-D representations of building structures, in accordance with some implementations. The method 300 is performed in a computing device (e.g., the device 108). The method includes obtaining (302) a plurality of images of a building structure (e.g., images of the house 102 captured by the image capturing device 104, received from the image related data 274, or retrieved from the image data 234). For example, the receiving module 214 receives images captured by the image capturing device 104, according to some implementations. The plurality of images comprises non-camera anchors (e.g., position of objects visible to the image capturing device 104, such as parts of a building structure, or its surrounding environment). In some implementations, the non-camera anchors are planes, lines, points, objects, and other features within an image of building structure or its surrounding environment. For example, the non-camera anchors include a roofline, or a door of a house, in an image. Some implementations use human annotations or computer vision techniques like line extraction methods or point detection to automate identification of the non-camera anchors. Some implementations use augmented reality (AR) frameworks, or output from AR cameras to obtain this data. Referring next to FIG. 3B, in some implementations, each image of the plurality of images is obtained (314) at arbitrary, distinct, or sparse positions about the building structure. In other words, the images are sparse and have wide baseline between them. Unlike in traditional photogrammetry, the images are not continuous or video streams, but are sparse. Referring next to FIG. 3N, some implementations predict (378) a number of images to obtain, prior to obtaining plurality of images. Some implementations predict the number of images to obtain by increasing (380) an outlier efficiency parameter based on a number of non-camera anchors identified in an image. Some implementations adjust (382) a frame rate of an imaging device that is obtaining the plurality of images based on the predicted number of images.

Referring now back to FIG. 3A, the method also includes identifying (304) reference poses (e.g., using the pose identification module 222) for the plurality of images based on the non-camera anchors. In some implementations, identifying the reference poses includes generating (306) a 3-D representation for the building structure. For example, the 3-D model generation module 220 generates one or more 3-D models of the building structure. In some implementations, the 3-D model generation module 220 includes a structure from motion module (see description above) that reconstructs a 3-D model of the building structure. In some implementations, the plurality of images is obtained using a smartphone, and identifying (304) the reference poses is further based on photogrammetry, GPS data, gyroscope, accelerometer data, or magnetometer data of the smartphone.

Some implementations identify the reference poses by generating a camera solve for the plurality of images, including determining the relative position of camera positions based on how and where common features are located in respective image plane of each image of the plurality of images. The more features that are co-visible in the images, the fewer degrees of freedom there are in a camera's rotation and translation, and a camera's pose may be derived, as further discussed with reference to FIG. 4. Some implementations use Simultaneous Localization and Mapping (SLAM) or similar functions for identifying camera positions. Some implementations use computer vision techniques along with GPS or sensor information, from the camera, for an image, for camera pose identification. It is noted that translation data between these reference poses is not scaled, so only the relative positions of the reference poses in camera space, not the geometric distance between the reference poses, is known at this point.

The method also includes obtaining (308) world map data including real-world poses for the plurality of images. For example, the receiving module 214 receives images plus world map data. Referring next to FIG. 3C, in some implementations, the world map data is obtained (316) while capturing the plurality of images. In some implementations, the plurality of images is obtained (318) using a device (e.g., an AR camera) configured to generate the world map data. For example, the image capture module 264 captures images while the world map generation module 272 generates world map data for the images at the respective poses or camera locations. Some implementations receive AR camera data for each image of the plurality of images. The AR camera data includes data for the non-camera anchors within the image as well as data for camera anchors (i.e., the real-world pose). Translation changes between these camera positions are in geometric space, but are a function of sensors that can be noisy (e.g., due to drifts in IMUs). In some instances, AR tracking states indicate interruptions, such as phone calls, or a change in camera perspective, that affect the ability to predict how current AR camera data relates to previously captured AR data.

Referring next to FIG. 3D, in some implementations, the plurality of images includes (320) a plurality of objects in an environment for the building structure, and the reference poses and the real-world poses include positional vectors and transforms (e.g., x, y, z coordinates, and rotational and translational parameters) of the plurality of objects. Referring next to FIG. 3E, in some implementations, the plurality of anchors includes (322) a plurality of camera positions, and the reference poses and the real-world poses include positional vectors and transforms of the plurality of camera positions. Referring next to FIG. 3F, in some implementations, the world map data further includes (324) data for the non-camera anchors within an image of the plurality of images. Some implementations augment (326) the data for the non-camera anchors within an image with point cloud information. In some implementations, the point cloud information is generated (328) by a LiDAR sensor. Referring next to FIG. 3G, in some implementations, the plurality of images are obtained (330) using a device configured to generate the real-world poses based on sensor data.

Referring now back to FIG. 3A, the method also includes selecting (310) at least two candidate poses (e.g., using the pose selection module 222) from the real-world poses based on corresponding reference poses. Given the problems with noisy data, interruptions, or changes in camera perspective, this step filters the real-world poses to produce reliable candidate AR poses. Some implementations select at least sequential candidate poses from the real-world poses based on ratios between or among the corresponding reference poses. Some implementations determine a ratio of translation changes of the reference poses to the ratio of translation changes in the corresponding real-world poses. Some implementations discard real-world poses where the ratio or proportion is not substantially constant. Substantially constant or substantially satisfied may mean within a sensor degree of error with respect to real-world poses or image pixel resolution with respect to reference poses; mathematical thresholds such as within 95% of each other may also amount to substantial matches as industry norms permit tolerances within 5% of ground truth in measurement predictions. Some implementations use the resulting candidate poses for applying their geometric translation to derive a scaling factor as further described below.

Referring next to FIG. 3H, in some implementations, the world map data includes (332) tracking states that include validity information for the real-world poses. Some implementations select the candidate poses from the real-world poses further based on validity information in the tracking states. Some implementations select poses that have tracking states with high confidence positions (as described below), or discard poses with low confidence levels. In some implementations, the plurality of images is captured (334) using a smartphone, and the validity information corresponds to continuity data for the smartphone while capturing the plurality of images. For example, when a user receives a call, rotates the phone from landscape to portrait or vice versa, or the image capture may be interrupted, the world map data during those time intervals are invalid, and the tracking states reflect the validity of the world map data.

Referring next to FIG. 3O, in some implementations, the method further includes generating (384) an inlier pose set of obtained real-world poses. In some implementations, the inlier pose set is (386) a subsample of real-world pose pairs that produces scaling factors within a statistical threshold of scaling factor determined from all real-world poses. In some implementations, the statistical threshold is (388) a least median of squares. In some implementations, selecting the at least two candidate poses includes selecting (390) from the real-world poses within the inlier pose set.

Referring back to FIG. 3A, the method also includes calculating (312) a scaling factor (e.g., using the scale calculation module 226) for a 3-D representation of the building structure based on correlating the reference poses with the candidate poses. If two candidate poses are sequential to one another, then the candidate poses can be used to calculate the scaling factor, for the 3-D representation, from the reference poses. Referring next to FIG. 3I, in some implementations, calculating the scaling factor is further based on obtaining (336) an orthographic view of the building structure, calculating (338) a scaling factor based on the orthographic view, and adjusting (340) (*i*) the scale of the 3-D representation based on the scaling factor, or (ii) a previous scaling factor based on the orthographic scaling factor. For example, some implementations determine scale using satellite imagery that provide an orthographic view. Some implementations perform reconstruction steps to show a plan view of the 3-D representation or camera information or image information associated with the 3-D representation. Some implementations zoom in/out the reconstructed model until it matches the orthographic view, thereby computing the scale. Some implementations perform measurements based on the scaled 3-D structure.

Referring next to FIG. 3J, in some implementations, calculating the scaling factor is further based on identifying (342) one or more physical objects (e.g., a door, a siding, bricks) in the 3-D representation, determining (344) dimensional proportions of the one or more physical objects, and deriving or adjusting (346) a scaling factor based on the dimensional proportions. This technique provides another method of scaling for cross-validation, using objects in the image. For example, some implementations locate a door and then compare the dimensional proportions of the door to what is known about the door. Some implementations also use siding, bricks, or similar objects with predetermined or industry standard sizes.

Referring next to FIG. 3K, in some implementations, calculating the scaling factor for the 3-D representation includes establishing (348) correspondence between the candidate poses and the reference poses, identifying (352) a first pose and a second pose of the candidate poses separated by a first distance, identifying (354) a third pose and a fourth pose of the reference poses separated by a second distance, the third pose and the fourth pose corresponding to the first pose and the second pose, respectively, and computing (356) the scaling factor as a ratio between the first distance and the second distance. In some implementations, identifying the reference poses includes associating (350) identifiers for the reference poses, the world map data includes identifiers for the real-world poses, and establishing the correspondence is further based on comparing the identifiers for the reference poses with the identifiers for the real-world poses.

Referring next to FIG. 3L, in some implementations, the method further includes generating (358) a 3-D representation for the building structure based on the plurality of images. In some implementations, the method also includes extracting (360) a measurement (e.g., using the measurements module 228) between two pixels in the 3-D representation by applying the scaling factor to the distance between the two pixels. In some implementations, the method also includes displaying the 3-D representation or the measurements for the building structure based on scaling the 3-D representation using the scaling factor.

Referring next to FIG. 3M, in some implementations, the method further includes extracting (362) illumination data (e.g., ambient lighting information) for the candidate poses (e.g., using the illumination module 230) from the world map data. The method also includes generating or displaying (364) a 3-D representation of the building structure, including illuminating the 3-D representation (e.g., using the illumination module 230 or the 3-D model generation module 220) based on the illumination data for the candidate poses. In some implementations, displaying the 3-D representation of the building structure comprises displaying (366) pixels for the one or more anchors. Some implementations transmit (e.g., using the transmitting module 218) the 3-D representation (with the illumination effects) to a client device (e.g., the smartphone used to capture the images) to display the 3-D representation of the building. In some implementations, the method further includes receiving (368) a user input (e.g., using the receiving module 214) selecting a perspective for displaying the 3-D representation, determining (370), for the perspective, one or more anchors from amongst the plurality of anchors, based on the candidate poses, extracting (372) illumination data for the one or more anchors from the world map data, and illuminating (374) the 3-D representation further based on the illumination data for the one or more anchors. In some implementations, illuminating the 3-D representation is further based on averaging (376) the illumination data for a first anchor and a second anchor of the one or more anchors.

In this way, the techniques provided herein use augmented reality frameworks, structure from motion, or LiDAR data, for reconstructing 3-D models of building structures (e.g., by generating measurements for the building structure, or illuminating the 3-D models).

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating a scaling factor for a building structure in a 3-D scene, the method comprising:
    obtaining a plurality of 2-D images of the 3-D scene, wherein the plurality of images comprises image features co-visible among at least two 2-D images;
    deriving reference poses for an imager based on the image features;
    obtaining world map data including real-world poses of the imager associated with the plurality of images, wherein the real-world poses are derived from an augmented reality framework and comprise geometric position information;
    selecting at least two candidate poses from the real-world poses based on translation changes between the real-world poses proportional with translation changes of corresponding reference poses; and
    calculating a scaling factor for the building structure based on the geometric position information of the at least two candidate poses.

2. The method of claim 1, further comprising generating a 3-D representation for the building structure based on the plurality of images and the reference poses.

3. The method of claim 1, further comprising generating a 3-D representation for the building structure based on the plurality of images and the at least two candidate poses.

4. The method of claim 2, further comprising extracting a measurement between two pixels in the 3-D representation by applying the scaling factor to a distance between the two pixels.

5. The method of claim 3, further comprising extracting a measurement between two pixels in the 3-D representation by applying the scaling factor to a distance between the two pixels.

6. The method of claim 1, wherein the world map data is obtained while capturing the plurality of images.

7. The method of claim 1, wherein the world map data includes tracking states for the real-world poses, and selecting the at least two candidate poses from the real-world poses is further based on validity information in the tracking states.

8. The method of claim 2, wherein calculating the scaling factor further comprises:
obtaining an orthographic view of the building structure;
calculating an external scaling factor based on the orthographic view; and
adjusting the scaling factor based on the external scaling factor.

9. The method of claim 3, wherein calculating the scaling factor further comprises:
obtaining an orthographic view of the building structure;
calculating an external scaling factor based on the orthographic view; and
adjusting the scaling factor based on the external scaling factor.

10. The method of claim 1, wherein calculating the scaling factor further comprises:
identifying one or more physical objects in the 2-D images;
determining dimensional proportions of the one or more physical objects; and
adjusting the scaling factor based on the dimensional proportions.

11. The method of claim 1, wherein calculating the scaling factor further comprises:
identifying a first pose and a second pose of the at least two candidate poses separated by a first distance;
identifying a third pose and a fourth pose of the reference poses separated by a second distance, the third pose and the fourth pose corresponding to the first pose and the second pose, respectively; and
computing the scaling factor as a ratio between the first distance and the second distance.

12. One or more non-transitory computer readable storage media storing instructions that, when executed by one or more processors, cause the one or more processors to execute operations for:
obtaining a plurality of 2-D images of a 3-D scene comprising a building structure, wherein the plurality of images comprises image features co-visible among at least two 2-D images;
deriving reference poses for an imager based on the image features;
obtaining world map data including real-world poses of the imager associated with the plurality of images, wherein the real-world poses are derived from an augmented reality framework and comprise geometric position information;
selecting at least two candidate poses from the real-world poses based on translation changes between the real-world poses proportional with translation changes of corresponding reference poses; and
calculating a scaling factor for the building structure based on the geometric position information of the at least two candidate poses.

13. The one or more non-transitory computer readable storage media of claim 12, further comprising instructions for generating a 3-D representation for the building structure based on the plurality of images and the reference poses.

14. The one or more non-transitory computer readable storage media of claim 12, further comprising instructions for generating a 3-D representation for the building structure based on the plurality of images and the at least two candidate poses.

15. The one or more non-transitory computer readable storage media of claim 13, further comprising instructions for extracting a measurement between two pixels in the 3-D representation by applying the scaling factor to a distance between the two pixels.

16. The one or more non-transitory computer readable storage media of claim 14, further comprising instructions for extracting a measurement between two pixels in the 3-D representation by applying the scaling factor to a distance between the two pixels.

17. The one or more non-transitory computer readable storage media of claim 12, wherein the world map data includes tracking states for the real-world poses, and selecting the at least two candidate poses from the real-world poses is further based on validity information in the tracking states.

18. The one or more non-transitory computer readable storage media of claim 13, wherein calculating the scaling factor further comprises:
obtaining an orthographic view of the building structure;
calculating an external scaling factor based on the orthographic view; and
adjusting the scaling factor based on the external scaling factor.

19. The one or more non-transitory computer readable storage media of claim 14, wherein calculating the scaling factor further comprises:
obtaining an orthographic view of the building structure;
calculating an external scaling factor based on the orthographic view; and
adjusting the scaling factor based on the external scaling factor.

20. The one or more non-transitory computer readable storage media of claim 12, wherein calculating the scaling factor further comprises:
identifying one or more physical objects in the 2-D images;
determining dimensional proportions of the one or more physical objects; and
adjusting the scaling factor based on the dimensional proportions.

21. The one or more non-transitory computer readable storage media of claim 12, wherein calculating the scaling factor further comprises:
identifying a first pose and a second pose of the at least two candidate poses separated by a first distance;
identifying a third pose and a fourth pose of the reference poses separated by a second distance, the third pose and the fourth pose corresponding to the first pose and the second pose, respectively; and
computing the scaling factor as a ratio between the first distance and the second distance.

22. A computer system for generating a scaling factor for a building structure in a 3-D scene, comprising:
one or more processors,
a display; and
memory;
wherein the memory stores one or more programs configured for execution by the one or more processors, and the one or more programs comprising instructions for:
obtaining a plurality of 2-D images of a 3-D scene comprising the building structure, wherein the plurality of images comprises image features co-visible among at least two 2-D images;
deriving reference poses for an imager based on the image features;

obtaining world map data including real-world poses of the imager associated with the plurality of images, wherein the real-world poses are derived from an augmented reality framework and comprise geometric position information;

selecting at least two candidate poses from the real-world poses based on translation changes between the real-world poses proportional with translation changes of corresponding reference poses; and calculating a scaling factor for the building structure based on the geometric position information of the at least two candidate poses.

23. The computer system of claim 22, wherein the world map data includes tracking states for the real-world poses, and the one or more programs further comprise instructions for selecting the at least two candidate poses from the real-world poses based on validity information in the tracking states.

24. The computer system of claim 22, wherein the one or more programs further comprise instructions for calculating the scaling factor by:
- identifying a first pose and a second pose of the at least two candidate poses separated by a first distance;
- identifying a third pose and a fourth pose of the reference poses separated by a second distance, the third pose and the fourth pose corresponding to the first pose and the second pose, respectively; and
- computing the scaling factor as a ratio between the first distance and the second distance.

* * * * *